US009521281B2

(12) United States Patent
Gotoh

(10) Patent No.: US 9,521,281 B2
(45) Date of Patent: Dec. 13, 2016

(54) IMAGE PROCESSING APPARATUS INCLUDING FIRST IMAGE PROCESSING SECTION PERFORMING FIRST IMAGE PROCESSING ON IMAGE DATA TO BE SUPPLIED TO IMAGE OUTPUT APPARATUS AND SECOND IMAGE PROCESSING SECTION PERFORMING SECOND IMAGE PROCESSING ON IMAGE DATA TO BE SUPPLIED TO IMAGE DISPLAY DEVICE, AND IMAGE FORMING APPARATUS INCLUDING THE IMAGE PROCESSING APPARATUS

(75) Inventor: Makio Gotoh, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 1964 days.

(21) Appl. No.: 12/754,398

(22) Filed: Apr. 5, 2010

(65) Prior Publication Data

US 2010/0253702 A1 Oct. 7, 2010

(30) Foreign Application Priority Data

Apr. 7, 2009 (JP) ................................. 2009-093337

(51) Int. Cl.
  *G06K 9/34* (2006.01)
  *H04N 1/00* (2006.01)
  (Continued)

(52) U.S. Cl.
  CPC ........ *H04N 1/0044* (2013.01); *H04N 1/40062* (2013.01); *H04N 1/41* (2013.01);
  (Continued)

(58) Field of Classification Search
  None
  See application file for complete search history.

(56) References Cited

U.S. PATENT DOCUMENTS 5,566,001 A * 10/1996 Saidi et al. .............. 358/426.02
5,987,221 A * 11/1999 Bearss et al. .................. 358/1.9
(Continued)

FOREIGN PATENT DOCUMENTS

JP  9-44128 A  2/1997
JP  9-135316 A  5/1997
(Continued)

OTHER PUBLICATIONS

Okawa T., et al., "Device, method and program for processing image," machine-translated Japanese application 2005-269380, published Sep. 2005.*
(Continued)

*Primary Examiner* — Ulka Chauhan
*Assistant Examiner* — Saptarshi Mazumder
(74) *Attorney, Agent, or Firm* — Birch, Stewart, Kolasch & Birch, LLP

(57) ABSTRACT

An image processing apparatus includes: a segmentation process section which performs a segmentation process on the image data; and a spatial filter section which performs first image processing that varies according to a result of the segmentation process. When a degree of downsampling in the downsampling process is not higher than a predetermined reference level, the spatial filter section performing the first image processing on the image data; and when the degree of downsampling in the downsampling process is higher than the predetermined reference level, the spatial filter section performs second image processing irrelevant to the result of the segmentation process, instead of performing the first image processing, on the image data. This brings about an advantage of making it possible to suppress deterioration in quality of an image whose preview is displayed.

8 Claims, 12 Drawing Sheets

(51) Int. Cl.
H04N 1/60 (2006.01)
H04N 1/41 (2006.01)
H04N 1/40 (2006.01)

(52) U.S. Cl.
CPC ....... H04N 1/6011 (2013.01); *H04N 1/40068* (2013.01); *H04N 2201/0082* (2013.01)

(56) References Cited

U.S. PATENT DOCUMENTS

| | | | |
|---|---|---|---|
| 6,037,939 A * | 3/2000 | Kashiwagi et al. | 715/798 |
| 6,204,932 B1 | 3/2001 | Haneda et al. | |
| 6,587,225 B1 | 7/2003 | Sakatani et al. | |
| 6,728,425 B1 | 4/2004 | Tokuyama et al. | |
| 6,839,151 B1 * | 1/2005 | Andree et al. | 358/2.1 |
| 7,536,055 B2 | 5/2009 | Ogawa | |
| 8,305,645 B2 | 11/2012 | Gotoh et al. | |
| 8,350,948 B2 | 1/2013 | Miyauchi et al. | |
| 2003/0044082 A1 | 3/2003 | Katayama et al. | |
| 2005/0041116 A1 | 2/2005 | Tsukioka | |
| 2007/0035706 A1 | 2/2007 | Margulis | |
| 2007/0206102 A1 * | 9/2007 | Yu et al. | 348/222.1 |
| 2007/0280533 A1 * | 12/2007 | Huang | 382/173 |
| 2008/0018920 A1 | 1/2008 | Kawamoto et al. | |
| 2008/0117468 A1 | 5/2008 | Ohkawa | |
| 2008/0285079 A1 * | 11/2008 | Kurakata | 358/1.15 |
| 2008/0297813 A1 | 12/2008 | Sanger et al. | |

FOREIGN PATENT DOCUMENTS

| | | |
|---|---|---|
| JP | 2000-134489 A | 5/2000 |
| JP | 2000-341505 A | 12/2000 |
| JP | 2001-334700 A | 12/2001 |
| JP | 2002-166616 A | 6/2002 |
| JP | 2002-232708 A | 8/2002 |
| JP | 2003-224734 A | 8/2003 |
| JP | 2004-106196 A | 4/2004 |
| JP | 2005-070300 A | 3/2005 |
| JP | 2005-175917 A | 6/2005 |
| JP | 2005-269380 A | 9/2005 |
| JP | 2006-13558 A | 1/2006 |
| JP | 2006-166283 A | 6/2006 |
| JP | 2007-013534 A | 1/2007 |
| JP | 2007-28336 A | 2/2007 |
| JP | 2007-48235 A | 2/2007 |
| JP | 2007-074362 A | 3/2007 |
| JP | 2008-28550 A | 2/2008 |
| JP | 2008-028760 A | 2/2008 |
| JP | 2008-124819 A | 5/2008 |
| JP | 2008-130058 A | 6/2008 |
| JP | 2008-187230 A | 8/2008 |

OTHER PUBLICATIONS

Yamamoto N., "Device and method for processing image," machine-translated Japanese application 09-135316, published May 1997.*

Ikeda H., "Photographing processing apparatus and photographic processing program," machine-translated Japanese application 2008-028760, published Feb. 2008.*

Office Action dated Nov. 21, 2011 for related U.S. Appl. No. 12/547,624.
Office Action dated Dec. 21, 2012 for related U.S. Appl. No. 12/547,557.
Office Action dated Dec. 3, 2012 for related U.S. Appl. No. 12/583,803.
Advisory Action dated Feb. 8, 2013 for related U.S. Appl. No. 12/583,803.
Office Action dated Jan. 16, 2013 for related U.S. Appl. No. 12/547,624.
Office Action dated Mar. 2, 2012 for related U.S. Appl. No. 12/547,989.
Advisory Action dated Jul. 6, 2012 for related U.S. Appl. No. 12/547,624.
Office Action dated Jun. 19, 2012 for related U.S. Appl. No. 12/547,965.
Office Action dated Jun. 6, 2012 for related U.S. Appl. No. 12/583,803.
Office Action dated Jul. 8, 2011 for Co-Pending U.S. Appl. No. 12/583,807.
Notice of Panel Decision dated Aug. 21, 2012 for Copending U.S. Appl. No. 12/547,624.
Office Action dated Sep. 6, 2012 for related U.S. Appl. No. 12/547,989.
U.S. Advisory Action issued in U.S. Appl. No. 12/583,803 on Oct. 2, 2013.
U.S. Office Action issued in U.S. Appl. No. 12/547,624 on Jul. 15, 2013.
U.S. Office Action issued in U.S. Appl. No. 12/583,803 on Jul. 5, 2013.
U.S. Notice of Allowance issued in U.S. Appl. No. 12/547,624 on Sep. 19, 2013.
U.S. Office Action issued in U.S. Appl. No. 12/547,989 on Sep. 13, 2013.
Office Action dated Jun. 14, 2013 for copending U.S. Appl. No. 12/547,557.
Office Action dated Mar. 1, 2013 for related U.S. Appl. No. 12/547,989.
US Advisory Action issued Dec. 3, 2013 in U.S. Appl. No. 12/547,989.
US Notice of Allowance issued Nov. 25, 2013 in U.S. Appl. No. 12/583,803.
US Notice of Panel Decision from Pre-Appeal Brief Review dated Feb. 20, 2014 in U.S. Appl. No. 12/547,989.
US Advisory Action issued Apr. 4, 2014 in related U.S. Appl. No. 12/547,557.
Final Office Action issued Dec. 19, 2013 in related U.S. Appl. No. 12/547,557.
US Examiner's Answer issued May 22, 2014 in related U.S. Appl. No. 12/547,989.
US Advisory Action issued in Co-Pending U.S. Appl. No. 12/547,557 on Feb. 9, 2015.
US Final Office Action issued Nov. 18, 2014 in related U.S. Appl. No. 12/547,557.
Decision on Appeal isued on Jun. 3, 2016 in co-pending U.S. Appl. No. 12/547,989.
US Final Office Action issued in U.S. Appl. No. 12/547,557.
Office Action dated Apr. 18, 2012 for related U.S. Appl. No. 12/547,624.

* cited by examiner (a)

(b)

F I G. 6
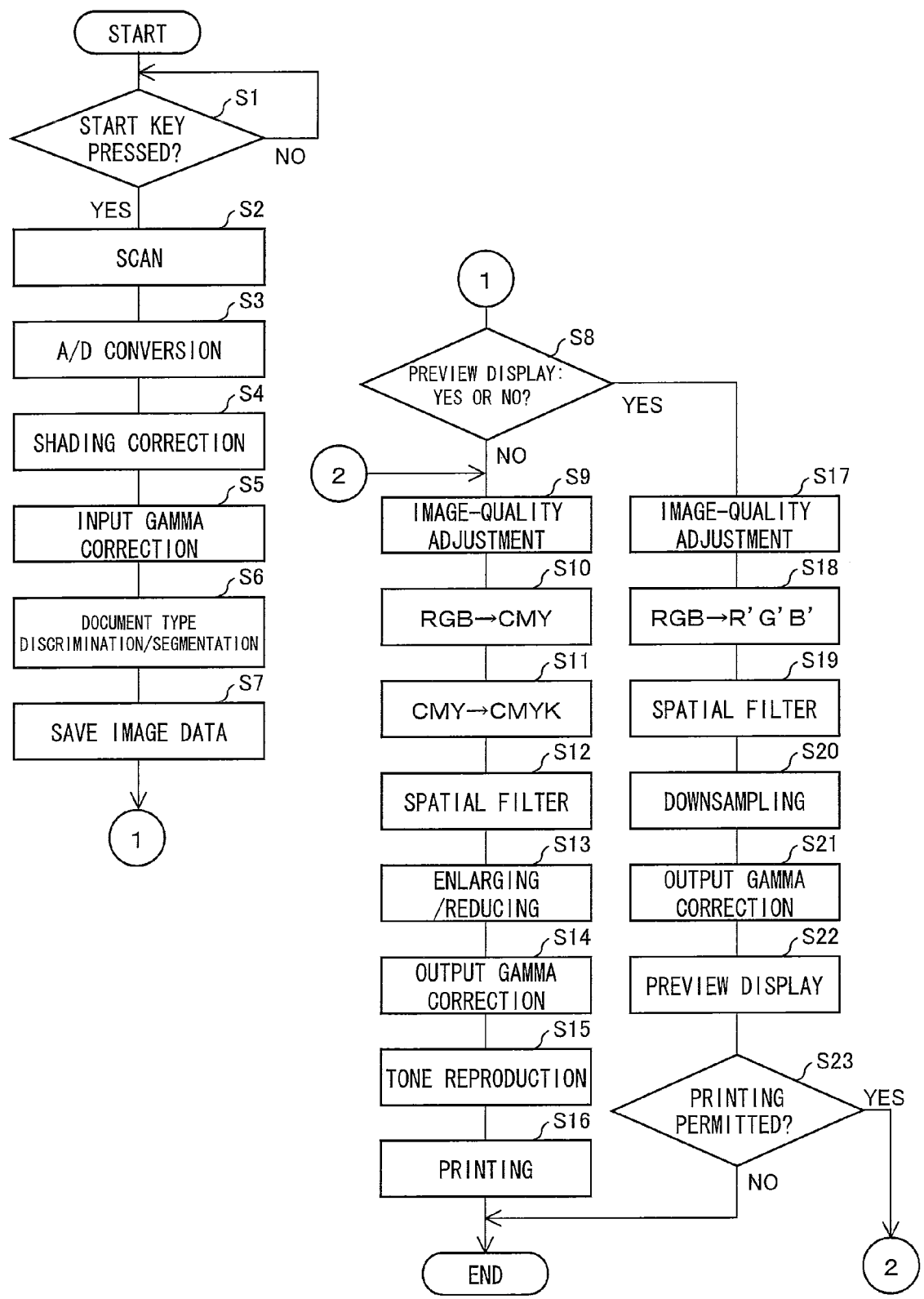

IMAGE PROCESSING APPARATUS INCLUDING FIRST IMAGE PROCESSING SECTION PERFORMING FIRST IMAGE PROCESSING ON IMAGE DATA TO BE SUPPLIED TO IMAGE OUTPUT APPARATUS AND SECOND IMAGE PROCESSING SECTION PERFORMING SECOND IMAGE PROCESSING ON IMAGE DATA TO BE SUPPLIED TO IMAGE DISPLAY DEVICE, AND IMAGE FORMING APPARATUS INCLUDING THE IMAGE PROCESSING APPARATUS

This Nonprovisional application claims priority under 35 U.S.C. §119(a) on Patent Application No. 2009-093337 filed in Japan on Apr. 7, 2009, the entire contents of which are hereby incorporated by reference.

BACKGROUND OF THE INVENTION

1. Field of the Invention

The present invention relates to an image processing apparatus for processing image data on a preview (thumbnail) to be displayed by a display device, an image forming apparatus, an image processing apparatus control method, a control program, and a storage medium.

2. Description of the Related Art

Image forming apparatuses such as copying machines and multifunction printers performs, in accordance with the type of document and the setting conditions (e.g., print density, enlarging/reducing ratio, single-side printing/duplex printing, margin size), image processing on image data indicative of an image to be printed. Furthermore, some image forming apparatuses causes a display device, in accordance with the image data subjected to image processing, a preview of the image to be printed. It should be noted that the preview display takes the form of a page-by-page display of each image to be printed or a simultaneous display of pages of images to be printed.

Moreover, normally, such an image forming apparatus performs a segmentation process in accordance with image data, and then executes, on the image data, image processing reflecting the result of the segmentation process, thus performing, on image data whose preview is to be displayed, the image processing reflecting the result of the segmentation process. For example, Patent Literature 1 below discloses a technique for judging, for each pixel of image data, whether or not the pixel belongs to a text area, for performing error diffusion on a text area without a summation of values of errors to avoid deformation in the contour of a text portion, and for performing a subtractive process on a nontext area by normal error diffusion.

CITATION LIST

Patent Literature 1

Japanese Patent Application Publication, Tokukai, No. 2003-224734 A (Publication Date: Aug. 8, 2003)

SUMMARY OF INVENTION

Technical Problem

However, in the case of a preview display of an image by an image forming apparatus, it is usual that an image read by a scanner of 600 dpi or 1,200 dpi is displayed by a display device of 72 dpi or 96 dpi and that a display device for displaying a preview is small in size. Therefore, it is necessary to perform a process of downsampling pixels (by interpolation) in accordance with the size and resolution of a display screen.

However, image data composed of segmentation class signals cannot be downsampled with interpolation, but are simply downsampled (i.e., downsampled without interpolation). This causes a lack of image information in some pixels, thus causing deterioration in image quality as a result. For example, as the result of a simple downsampling process performed on image data composed of segmentation class signals, a pixel supposed to be treated as a text is not treated as such; therefore, an image containing a nontext pixel is generated in a text area. This causes degradation in legibility of texts, thus causing deterioration in image quality.

The present invention has been made to solve the foregoing problems, and it is an object of the present invention to provide an image processing apparatus capable of inhibiting deterioration in image quality of an image whose preview is displayed.

Solution to Problem

In order to solve the foregoing problems, the present invention is characterized by an image processing apparatus for performing a downsampling process on image data, and for supplying the image data after the downsampling process to a display device as image data for use in a display, the image processing apparatus including: a segmentation process section which performs a segmentation process on the image data; and an image processing section which performs first image processing that varies according to a result of the segmentation process, when a degree of downsampling in the downsampling process is not higher than a predetermined reference level, the image processing section performing the first image processing on the image data, when the degree of downsampling in the downsampling process is higher than the predetermined reference level, the image processing section neglecting to perform the first image processing on the image data.

The arrangement of the present invention performs the first image processing when the degree of downsampling is not higher than the predetermined reference level (i.e., when the amount of data to be downsampled is small), and does not perform the first image processing when the degree of downsampling is higher than the predetermined reference level (i.e., when the amount of data to be downsampled is large). Therefore, there is remarkable deterioration in image quality due to an overhigh degree of downsampling, the present invention supplies the image data to the display device without performing the first image processing. This brings about an advantage of making it possible to suppress deterioration in quality of an image that is displayed in accordance with the image data after the downsampling process.

Further, the arrangement of the present invention executes the first image processing when because the first image processing, if performed, does not result in as high a degree of downsampling the deterioration in image quality makes no problem, thus displaying a high-quality image reflecting the result of the segmentation process.

Advantageous Effects of Invention

The present invention is such that: first image processing that varies according to a result of the segmentation process is performed when a degree of downsampling with respect to image data is not higher than a predetermined reference level (i.e., when the amount of data to be downsampled is small); and the first image processing is not performed on the image data when the degree of downsampling with respect to the image data is higher than the predetermined reference level (i.e., when the amount of data to be downsampled is large). This brings about an advantage of making it possible to suppress deterioration in quality of an image that is displayed in accordance with the image data after the downsampling process.

For a fuller understanding of the nature and advantages of the invention, reference should be made to the ensuing detailed description taken in conjunction with the accompanying drawings.

BRIEF DESCRIPTION OF DRAWINGS

FIG. 6 is a flow chart showing steps of a process that is performed by the image forming apparatus in the copy mode and the full-color mode.

DETAILED DESCRIPTION OF THE INVENTION

[Embodiment 1]

Figure 1:
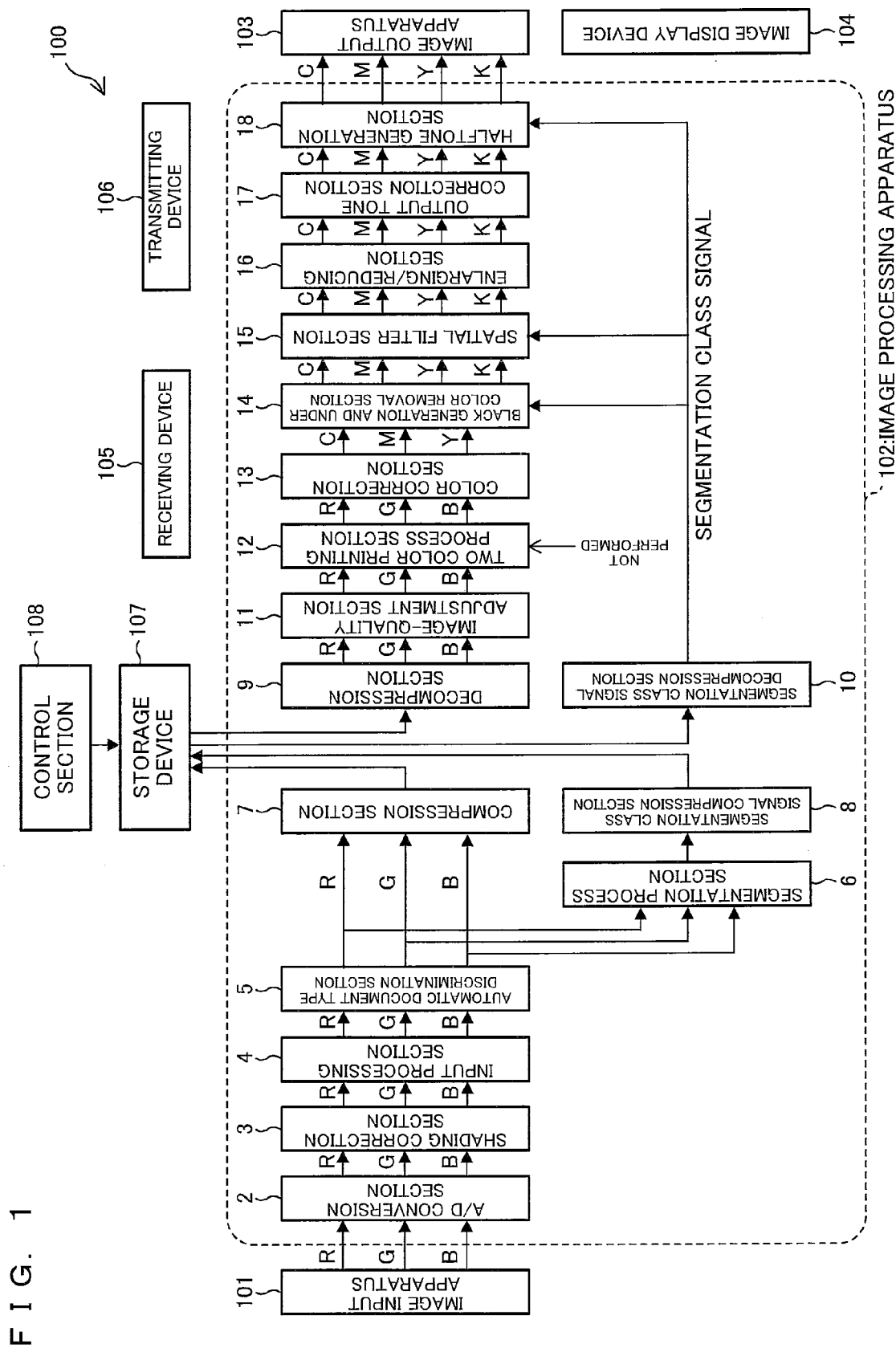
FIG. 1 is a block diagram showing an image forming apparatus of the present embodiment and showing the flow of image data in a printing process in a copy mode and a full-color mode.

One embodiment of an image forming apparatus of the present invention is described below with reference to the attached drawings. FIG. 1 is a block diagram schematically showing an arrangement of an image forming apparatus 100 of the present embodiment.

The image forming apparatus 100 of the present embodiment is a digital color multifunction printer that executes a mode selected from among a copy mode, a print mode, a facsimile transmission mode, a facsimile reception mode, and an image transmission mode.

The copy mode (copy mode) means a mode in which to read image data (generates image data by scanning a document) and print an image of the image data onto a sheet of paper. The print mode means a mode in which to print, onto a sheet of paper, an image of image data sent from a terminal apparatus connected to the image forming apparatus 100. The facsimile transmission mode means: a normal facsimile mode in which to transmit, to an external apparatus via a telephone line, image data obtained by scanning a document; and an Internet facsimile mode in which to transmit an e-mail with the image data attached thereto. The facsimile reception mode means a mode in which to receive image data from an external apparatus by facsimile and print an image of the received image data onto a sheet of paper. The image transmission mode means: (a) a mode (scan to e-mail mode) in which to attach, to an e-mail, image data generated by scanning a document, and transmit the e-mail to a specified address; (b) a mode (scan to ftp mode) in which to transmit, to a folder specified by a user, image data generated by scanning a document; and (c) a mode (scan to usb mode) in which to transmit, to a USB memory mounted in the image forming apparatus 100, image data generated by scanning a document. It should be noted that the facsimile transmission mode and the image transmission mode are each classified as above according to the type of image processing operation.

Further, in the copy mode or print mode, the user can select a black-and-white mode in which to output a black-and-white image, a full-color mode in which to output a full-color mage, a single-color mode in which to output a monochrome image having only one color desired by the user, or a two-color mode in which to output a two-color image having black and one color desired by the user.

For example, in cases where the user selects the single-color mode in the copy mode or print mode, the monochromatic image is printed. Further, in cases where the user selects the two-color mode in the copy mode or print mode, the two-color image is printed. It should be noted that in the single-color mode or two-color mode, the user selects his/her desired color from among R (red), G (green), B (blue), C (cyan), M (magenta), and Y (yellow).

Further, according to the present invention it is possible to set an automatic discrimination mode in the copy mode. In the automatic discrimination mode, the image forming apparatus 100 performs auto color selection (ACS) for judging whether an object to be copied is a color document or a black-and-white document. In the case of a color document, the image forming apparatus 100 performs an output process in the full-color mode. In the case of a black-and-white document, the image forming apparatus 100 performs an output process in the black-and-white mode.

As shown in FIG. 1, the image forming apparatus 100 includes an image input apparatus 101, an image processing apparatus 102, an image output apparatus (output apparatus) 103, an image display device 104, a receiving device 105, a transmitting device (output device) 106, a storage device 107, and a control section 108.

The image input apparatus 101 is image scanning means for generating image data by scanning (reading) a document in the copy mode, the facsimile transmission mode, and the image transmission mode. More specifically, the image input apparatus 101, which includes a line sensor (scanner section) having a CCD (charge-coupled device), converts light reflected by a document placed on a platen into an electrical signal separated into colors RGB (i.e., into an analog image signal) and sends the electrical signal to the image processing apparatus 102.

It should be noted that the image input apparatus 101 scans a document image in full color in any one of the full-color mode, the single-color mode, and the two-color mode. Further, the image input apparatus 101 scans a document image in full color even in cases where the image processing apparatus 102 performs the aforementioned auto color selection.

The image processing apparatus 102 is an integrated circuit, constituted by an ASIC (application specific integrated circuit), which performs image processing on image data (image signals). As shown in FIG. 1, the image processing apparatus 102 includes the following blocks: an A/D (analog/digital) conversion section 2, a shading correction section 3, an input processing section 4, an automatic document type discrimination section 5, a segmentation process section 6, a compression (encode) section 7, a segmentation class signal compression (encode) section 8, a decompression (decode) section 9, a segmentation class signal decompression (decode) section 10, an image-quality adjustment section 11, a two-color printing process section 12, a color correction section 13, a black generation and under color removal section 14, a spatial filter section 15, an enlarging/reducing (zoom process) section 16, an output tone correction section 17, and a halftone generation section 18. Processes that are performed by the blocks of the image processing apparatus 102 will be detailed later.

In the copy mode, facsimile transmission mode, or image transmission mode, the image processing apparatus 102 performs image processing on image data sent from the image input apparatus 101. In the print mode, the image processing apparatus 102 performs image processing on image data transmitted from a terminal apparatus. In the facsimile reception mode, the image processing apparatus 102 performs image processing on image data received from an external apparatus. Then, in the copy mode, print mode, or facsimile reception mode, the image processing apparatus 102 transmits, to the image output apparatus 103, the image data subjected to image processing. In the facsimile transmission mode, the image processing apparatus 102 transmits, to the transmitting device 106, the image data subjected to image processing. Further, in the scan to e-mail mode, which is an image transmission mode, the image processing apparatus 102 transmits, to a mail processing section (not shown), the image data subjected to image processing. In the scan to ftp mode, which is another image transmission mode, the image processing apparatus 102 transmits, to a predetermined folder, the image data subjected to image processing. In the scan to usb mode, which is the other image transmission mode, the image processing apparatus 102 transmits, to a predetermined USB memory, the image data subjected to image processing.

The image output apparatus (printer) 103 forms, onto a recording medium (e.g., a sheet of paper), an image of image data sent from the image processing apparatus 102. An example is an electrophotographic or ink-jet color printer. The term "printing" in the present embodiment means printing in the print mode, printing in the copy mode, or printing in the facsimile reception mode.

The image display device 104 is a liquid crystal display provided in an operation panel (not shown) of the image forming apparatus 100, and is display means capable of displaying a color image. Further, the image display device 104, covered with a touch panel, functions as an input interface of the image forming apparatus 100. That is, the image display device 104 displays a GUI for inputting various commands to the image forming apparatus 100 and an operation guide.

Further, before execution of printing in the copy mode or facsimile reception mode, the image forming apparatus 100 of the present embodiment can display, on the image display device 104, a preview of an image to be printed. Furthermore, before execution of transmission in the facsimile transmission mode or image transmission mode, the image forming apparatus 100 of the present embodiment can display, on the image display device 104, a preview of an image to be transmitted.

Further, in the copy mode or image transmission mode and the full-color mode, the image display device 104 displays a preview of a full-color image. In the copy mode or image transmission mode and the single-color mode, the image display device 104 displays a preview of a monochrome image. In the copy mode or image transmission mode and the two-color mode, the image display device 104 displays a preview of a two-color image.

The image display device 104 is not limited to the liquid crystal display, and may be display means other than the liquid crystal display (e.g., an organic EL display or a plasma display).

The receiving device 105 is a device, connected to a telephone line or the Internet, which receives image data from an external apparatus by facsimile communication. Further, the transmitting device 106 is a device, connected to a telephone line or the Internet, which transmits, to an external apparatus by facsimile communication, image data inputted to the image input apparatus 101.

The storage device 107 is a hard disk in which image data to be processed in the image processing apparatus 102 is temporarily stored.

The control section 108 is a computer including a processor such as a CPU (central processing unit) or a DSP (digital signal processor), and comprehensively controls various types of hardware provided in the image forming apparatus 100. Further, the control section 108 functions to control data transfer between pieces of hardware provided in the image forming apparatus 100.

The following details the processes that are executed by the blocks of the image processing apparatus 102 in the copy mode, the facsimile transmission mode, the facsimile reception mode, and the image transmission mode, respectively. It should be noted that the image processing apparatus 102 of the present embodiment has a block that operates while a mode a is being used but does not operate while a mode b different from the mode a is being used (the mode a and the mode b each being any one of the copy mode, the facsimile transmission mode, the facsimile reception mode, and the image transmission mode). Further, the image processing apparatus 102 has a block that varies in processing according to the mode being used. Furthermore, the image processing apparatus 102 has: a block that, even in the same mode, operates in processing of image data to be printed (transmitted) but does not operate in processing of image data to be previewed; and a block that, even in the same mode, varies between processing of image data to be printed (transmitted) and processing of image data to be previewed. In the following, therefore, the processes that are executed by the blocks of the image processing apparatus 102 are described according to the type of mode, and those processes which are executed in a printing process (or in a transmission process) and those processes which are executed at the time of a preview display are described separately.

(1) Copy Mode (1-1) Printing Process (Image Print Job)

In the following, the image processing apparatus 102 is described with reference to FIG. 1, which shows the flow of image data in the image processing apparatus 102 performing a printing process in the copy mode and the full-color mode.

The A/D (analog/digital) conversion section 2 is a block that receives color image signals (RGB analog signals) from the image input apparatus 101 and converts the color image signals into digital image data (RGB digital signals). The shading correction section 3 is a block that receives image data form the A/D conversion section 2 and subjects the image data to a process of removing various distortions generated in illuminating, image-focusing, and image-sensing systems of the image input apparatus 101. The input processing section 4 is a block that receives RGB image data from the shading correction section 3 and subjects each of the RGB image data to a tone conversion process such as a gamma correction process.

In accordance with RGB image data (RGB density signals) subjected to processing such as gamma correction in the input processing section 4, the automatic document type discrimination section 5 discriminates among types of documents scanned by the image input apparatus 101. It should be noted here that the types of documents among which the automatic document type discrimination section 5 discriminates are a text document, a printed-picture document, a text/printed-picture document containing a text and a printed picture together, and the like. The automatic document type discrimination section 5 can determine the type of a document according to a technique described, for example, in Japanese Patent Application Publication, Tokukai, No. 2002-232708 A. This technique will be described later in detail.

Further, in accordance with the image data, the automatic document type discrimination section 5 can perform auto color selection (ACS) for judging whether a scanned document is a color document or a black-and-white document and a process of judging whether or not a scanned document is a blank document (a solid-color document). It should be noted that the automatic document type discrimination section 5 sends the RGB image data to the segmentation process section 6 and the compression section 7.

In accordance with the RGB image data sent from the automatic document type discrimination section 5, the segmentation process section 6 performs a process of judging, for each pixel of the input image, what image area the pixel is classified into and generating a segmentation class signal indicating a result of the judgment. It should be noted here that the types of image areas among which the segmentation process section 6 discriminates are a black text area, a color text area, a halftone dot area, and the like. The segmentation process may take the form of a process of judging, for each block of pixels, what image area the block is classified into, instead of taking the form of a process of judging, for each pixel, what image area the pixel is classified into.

The compression section 7 is a block that performs a process of encoding image data (RGB signals) sent from the automatic document type discrimination section 5. The encoding is performed, for example, based on JPEG (Joint Photographic Experts Group).

The segmentation class signal compression section 8 is a block that performs a compression (encode) process on a segmentation class signal generated for each pixel. The compression process in the segmentation class signal compression section 8 is performed, for example, based on MMR (Modified Modified Read) or MR (Modified Read), which is a lossless compression technology.

The control section 108 receives encoded codes (encoded image data) from the compression section 7 and segmentation class signal codes (encoded segmentation class signals) from the segmentation class signal compression section 8, stores them temporarily in the storage device 107, and manages them as filing data. Then, in response to an instruction for a copy output operation, the control section 108 reads out, from the storage device 107, an encoded code and a segmentation class signal code corresponding to the encoded code, and sends them to the decompression section 9 and the segmentation class signal decompression section 10, respectively.

The control section 108 writes the storage address or data name of the encoded code and the storage address of the segmentation class signal code in a management table in association with each other. That is, the control section 108 controls reading or writing of encoded codes and segmentation class signal codes with reference to the management table.

The decompression section 9 decompresses the encoded code into RGB image data by performing a decompression (decode) process on the encoded code. Further, the segmentation class signal decompression section 10 performs a decompression process on the segmentation class signal code. The resulting segmentation class signal is sent to the black generation and under color removal section 14, the spatial filter section 15, and the halftone generation section 18. Then, the black generation and under color removal section 14, the spatial filter section 15, and the halftone generation section 18 select image processing according to the type of image area.

The image-quality adjustment section 11 receives the RGB image data from the decompression section 9, and performs background removal correction on the RGB image data by detecting a background in the RGB image data. Furthermore, the image-quality adjustment section 11 adjusts RGB balance (color adjustment of red, green, or blue), brightness, and intensity (saturation) in accordance with configuration information inputted by the user from the operation panel (not shown).

Furthermore, in the single-color mode, the image-quality adjustment section 11 converts the RGB image data into CMY image data complementary to the RGB-image data. It should be noted here that the conversion of the RGB data into the CMY image data in the single-color mode is executed by using Eq. (1) below, where the coefficients r1 to r3 are defined based on [Table 1]. For example, in cases where the user selects cyan as his/her desired color in the single-color mode, the values of r1 to r3 in the column "Cyan" are referred to, with the result that r1=1, r2=0, and r3=0 are selected.

$$\begin{pmatrix} C \\ M \\ Y \end{pmatrix} = \begin{pmatrix} r1 \cdot a1 & r1 \cdot a2 & r1 \cdot a3 \\ r2 \cdot a1 & r2 \cdot a2 & r2 \cdot a3 \\ r3 \cdot a1 & r3 \cdot a2 & r3 \cdot a3 \end{pmatrix} \times \begin{pmatrix} R \\ G \\ B \end{pmatrix} + \begin{pmatrix} r1 \cdot c \\ r2 \cdot c \\ r3 \cdot c \end{pmatrix} \quad \text{Eq. (1)}$$

a1=−0.23046675
a2=−0.79296875
a3=0.0234375
c=255

TABLE 1

| Adjustment | Output Color (Single Color) | | | | | |
|---|---|---|---|---|---|---|
| Plane | Red | Green | Blue | Cyan | Magenta | Yellow |
| r1 | 0 | 1 | 1 | 1 | 0 | 0 |
| r2 | 1 | 0 | 1 | 0 | 1 | 0 |
| r3 | 1 | 1 | 0 | 0 | 0 | 1 |

Figure 2:
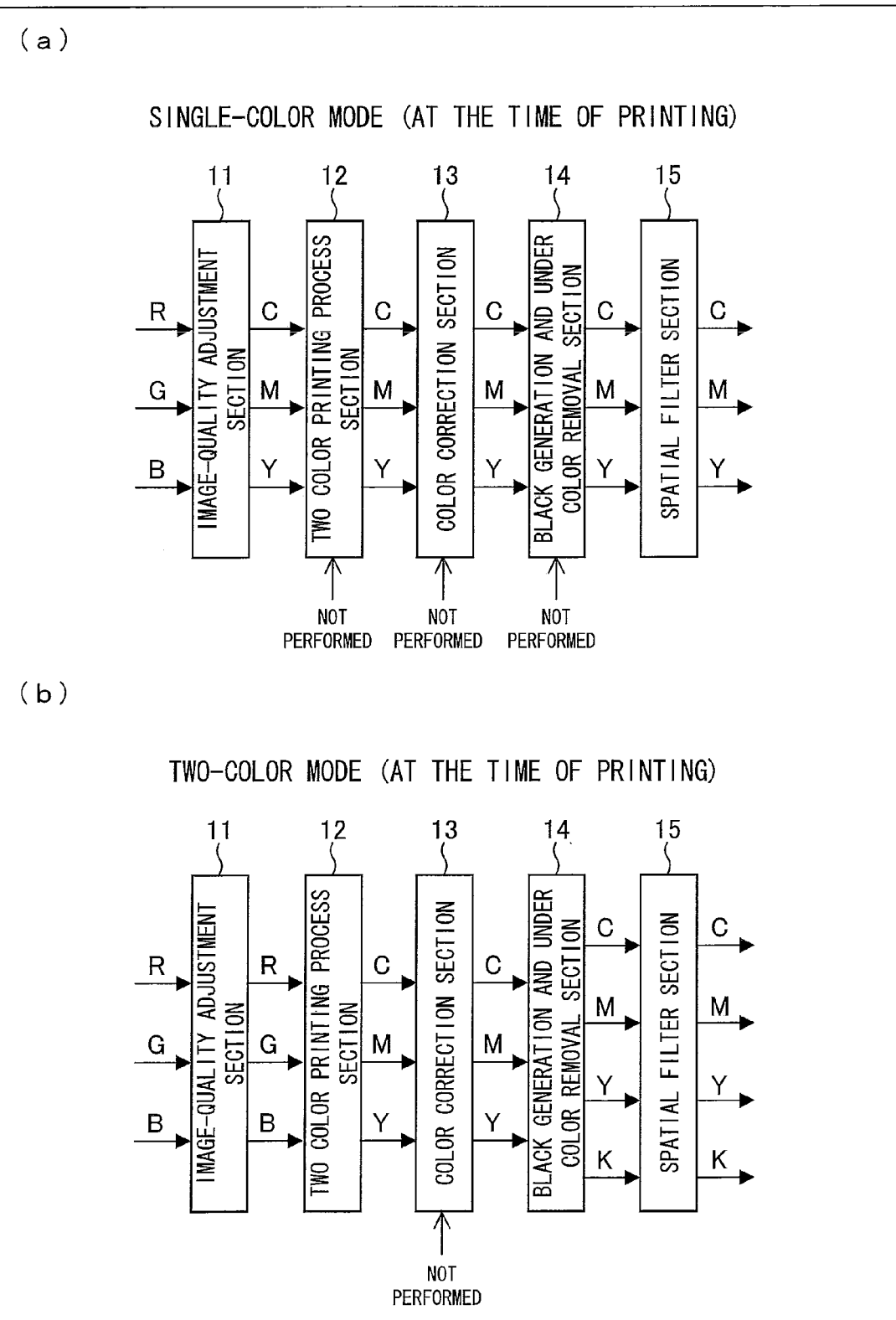
FIG. 2 shows block diagrams showing a part inside of an image processing apparatus (a) performing a printing process in the copy mode and a single-color mode and (b) performing a printing process in the copy mode and a two-color mode.

That is, whereas the output from the image-quality adjustment section 11 in the full-color mode is RGB image data as shown in FIG. 1, the output from the image-quality adjustment section 11 in the single-color mode is CMY image data as shown in (a) of FIG. 2. It should be noted that the output from the image-quality adjustment section 11 in the two-color mode is RGB image data as shown in (b) of FIG. 2. (a) of FIG. 2 shows some of the blocks of the image processing apparatus 102 performing a printing process in the copy mode and the single-color mode, and (b) of FIG. 2 shows some of the blocks of the image processing apparatus 102 performing a printing process in the copy mode and the two-color mode.

Further, the adjustment of intensity by the image-quality adjustment section 11 can be realized by using the matrix of Eq. (1) after varying the values of r1 to r3 and a1 to a3 of the matrix. This makes it possible to use the same matrix and the same image processing circuit for the adjustment of intensity and the conversion of image data (from RGB into CMY) in the single-color mode. Therefore, in the present embodiment, the adjustment of intensity and the conversion of image data in the single-color mode are performed by the same processing section (image-quality adjustment section 11).

The two-color printing process section 12 is a block that, in the two color mode, receives RGB image data from the image-quality adjustment section 11 and converts the RGB image into CMY image data as shown in (b) of FIG. 2. The conversion of the RGB image data into the CMY image data in the two-color mode can be realized, for example, by a technique of [Embodiment 1] or [Embodiment 2] described in Japanese Patent Application Publication, Tokukai, No. 2007-28336 A.

Further, in the full-color mode, as shown in FIG. 1, the two-color printing process section 12 performs no processing on the image data sent from the image-quality adjustment section 11 and passes the image data directly on to the color correction section 13. Furthermore, in the single-color mode, as shown in (a) of FIG. 2, two-color printing process section 12 performs no processing on the CMY image data sent from the image-quality adjustment section 11 and passes the image data directly on to the color correction section 13.

The color correction section 13 is a block that, in the full-color mode, receives RGB image data from the two-color printing process section 12, performs a color correction process of converting the RGB image data into CMY image data, and performs a process of improving the color reproducibility of the image data. The color correction process is realized by creating an LUT (look-up table) of input values (RGB) and output values (CMY) associated with one another and looking up the output values in the created LUT.

Further, in the single-color mode or two-color mode, as shown in FIG. 2, the color correction section 13 performs no processing on the CMY image data sent from the two-color printing process section 12 and passes the image data directly on to the black generation and under color removal section 14.

The black generation and under color removal section 14 is a block that, in the full-color mode or two-color mode, receives CMY image data from the color correction section 13, generates black (K) image data from the CMY image data, and generate new CMY image data by subtracting the black (K) image data from the original CMY image data. Thus, in the full-color mode or two-color mode, as shown in FIG. 1 or (b) of FIG. 2, the black generation and under color removal section 14 converts the CMY image data into four colors of image data CMYK.

Further, in the single-color mode, as shown in (a) of FIG. 2, the black generation and under color removal section 14 performs no processing on the CMY image data sent from the color correction section 13 and passes the image data directly on to the subsequent spatial filter section 15.

In the full-color mode or two-color mode, the output from the black generation and under color removal section 14 and the input to and output from each block subsequent to the black generation and under color removal section 14 are CMYK image data as shown in FIG. 1. Meanwhile, in the single-color mode, the output from the black generation and under color removal section 14 and the input to and output from each block subsequent to the black generation and under color removal section 14 are CMY image data unlike in FIG. 1.

The spatial filter section 15 receives the CMYK or CMY image data from the black generation and under color removal section 14 and performs a spatial filter process (e.g., edge enhancement process, smoothing process) on the image data by a digital filter in accordance with the segmentation class signals. That is, the spatial filter section 15 executes image processing differently for each image area in accordance with the segmentation class signals.

The enlarging/reducing section 16 is a block that enlarges or reduces an image in accordance with an enlarging/reducing command (information indicating the zoom ratio of a printed image) inputted by the user from the operation panel (not shown).

The output tone correction section 17 is a block that receives image data from the enlarging/reducing section 16 and performs output gamma correction for outputting the image data onto a recording medium such as a sheet of paper. The halftone generation section 18 executes, by dithering or error diffusion, a tone reproduction process (halftone generation process) necessary for the image output apparatus 103 to print an image.

Then, the halftone generation section 18 passes the CMYK or CMY image data on to the image output apparatus 103, and the image output apparatus 103 prints an image of the image data onto a recording medium (e.g., a sheet of paper).

(1-2) Preview Display

Figure 3:
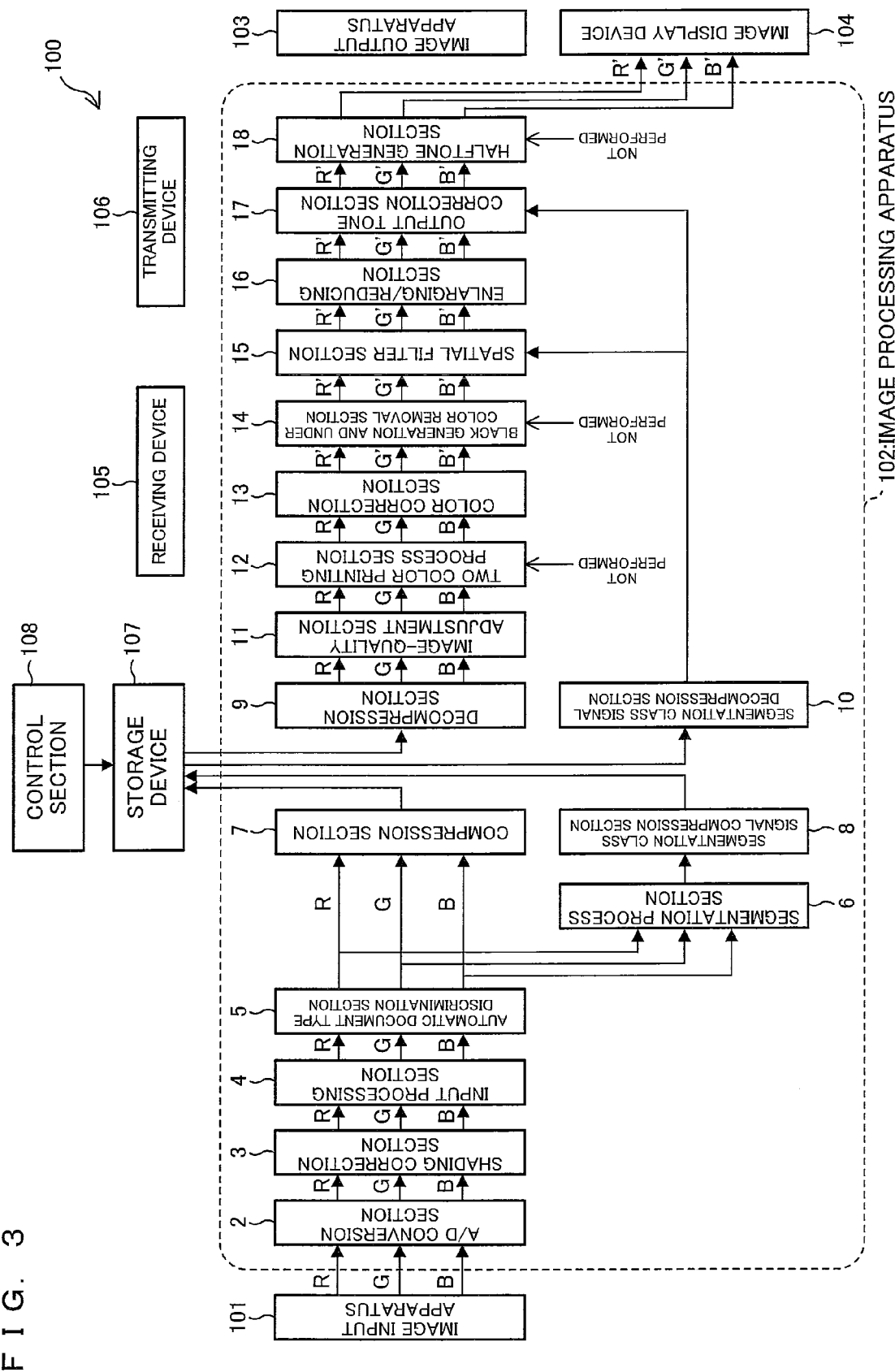
FIG. 3 is a block diagram showing the image forming apparatus of the present embodiment and showing the flow of image data in a preview display process in the copy mode and the full-color mode.

Next, the processes that are executed by the blocks of the image processing apparatus 102 in cases where a preview of an image to be printed is displayed in the copy mode are described with reference to FIG. 3. FIG. 3 is a block diagram showing the same image forming apparatus 100 as in FIG. 1 and showing the flow of image data at the time of a preview display process in the copy mode and the full-color mode.

It should be noted that because the A/D conversion section 2, the shading correction section 3, the input processing section 4, the automatic document type discrimination section 5, the segmentation process section 6, the compression section 7, the segmentation class signal compression section 8, the decompression section 9, the image-quality adjustment section 11, and the two-color printing process section 12 perform the same processes as in the case of a printing process, such processes will not be described below.

At the time of a preview display, as shown in FIG. 3, the segmentation class signal decompression section 10 decompresses (decodes) segmentation class signals and passes them on to the spatial filter section 15 and the output tone correction section 17.

In the full-color mode, the color correction section 13 receives RGB image data in color space of the scanner (image input apparatus 101). Then, the color correction section 13 converts the RGB image data into R'G'B' image data in color space of the image display device 104.

That is, the color correction section 13 converts the RGB image data, which conform to the image scanning characteristics of the scanner, into the R'G'B' image data, which conform to the display characteristics of the display device. It should be noted that the conversion of the RGB image data into the R'G'B' image data is also realized by creating an LUT (look-up table) of input values (RGB) and output values (R'G'B') associated with one another and looking up the output values in the created LUT.

Moreover, in the full-color mode, the present embodiment uses the same image processing circuit for the conversion of RGB image data into CMYK image data at the time of a printing process and the conversion of RGB image data into R'G'B' image data at the time of a preview display.

Figure 4:
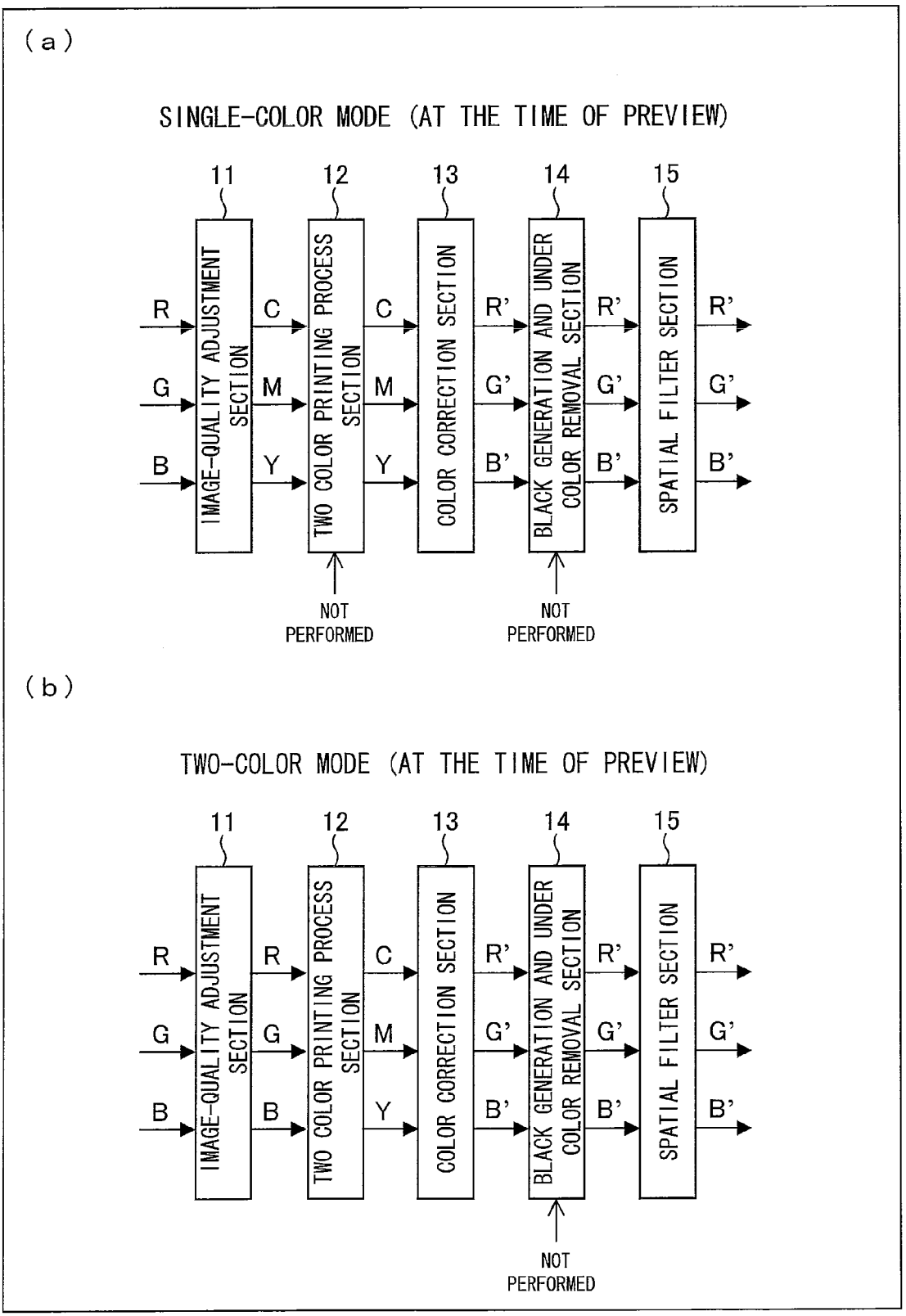
FIG. 4 shows block diagrams showing a part inside of the image processing apparatus (a) performing a preview display in the copy mode and the singe-color mode and (b) performing a preview display in the copy mode and the two-color mode.

As with FIG. 1, FIG. 3 shows the image forming apparatus 100 in the full-color mode. In the full-color mode, the color correction section 13 receives RGB image data. Meanwhile, in the single-color mode or two-color mode, as shown in FIG. 4, the color correction section 13 receives CMY image data. (a) of FIG. 4 shows some blocks of the image processing apparatus 2 performing a preview display in the copy mode and the singe-color mode, and (b) of FIG. 4 shows some blocks of the image processing apparatus performing a preview display in the copy mode and the two-color mode.

Then, in the single-color mode or two-color mode, the color correction section 13 converts the CMY image data into R'G'B' image data. That is, the color correction section 13 converts the CMY image data, which conform to the printing characteristics of the printing process, into the R'G'B' image data, which conform to the display characteristics of the display device. It should be noted that the conversion of the CMY image data into the R'G'B' image data is also realized by creating an LUT (look-up table) of input values (RGB) and output values (R'G'B') associated with one another and looking up the output values in the created LUT.

In any one of the single-color mode, the two-color mode, and the full-color mode, as shown in FIGS. 3 and 4, the black generation and under color removal section 14 performs no processing on the R'G'B' image data sent from the color correction section 13 and passes the image data directly on to the subsequent spatial filter section 15.

The spatial filter section 15 receives the R'G'B' image data from the black generation and under color removal section 14 and performs a spatial filter process (e.g., edge enhancement process, smoothing process) on the image data by a digital filter in accordance with the segmentation class signals. That is, as in the case of a printing process, the spatial filter section 15 executes image processing differently for each image area in accordance with the segmentation class signals.

The enlarging/reducing section 16 performs a downsampling process by which the number of pixels of an image composed of the R'G'B' image data sent from the spatial filter section 15 is converted into the number of pixels of the image display device 104 (process by which the number of pixels is reduced). The image display device 104, provided in the operation panel of the image forming apparatus 100, is lower in resolution than image data to be printed and, usually, is an extremely small display. Therefore, at the time of a preview display, it is necessary to downsample the image data. Further, in the enlarging/reducing section 16, the downsampling process is performed so that the display image is enlarged or reduced in accordance with an enlarging/reducing command (information indicating the zoom ratio of a display, e.g., a zoom ratio of 2 to 4 times or 200% to 400%) inputted from the operation panel (not illustrated) provided in the image forming apparatus. This causes an enlarging/reducing process to be performed on the display image. It should be noted that when the display image is enlarged and the image display device 104 cannot display the whole of the image thus enlarged, the image display device 104 displays a part of the image thus enlarged.

Figure 5:
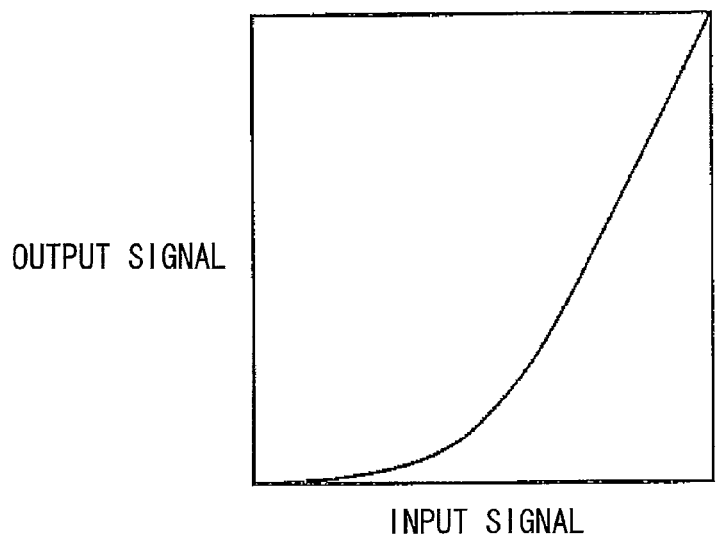
FIG. 5 shows gamma curves, i.e., (a) an example of a gamma curve corresponding to the display characteristics of an image display device and (b) a solid line representing a gamma curve for texts to be sharply displayed and a dotted line representing a gamma curve corresponding to the display characteristics of the image display device.
Figure 5:
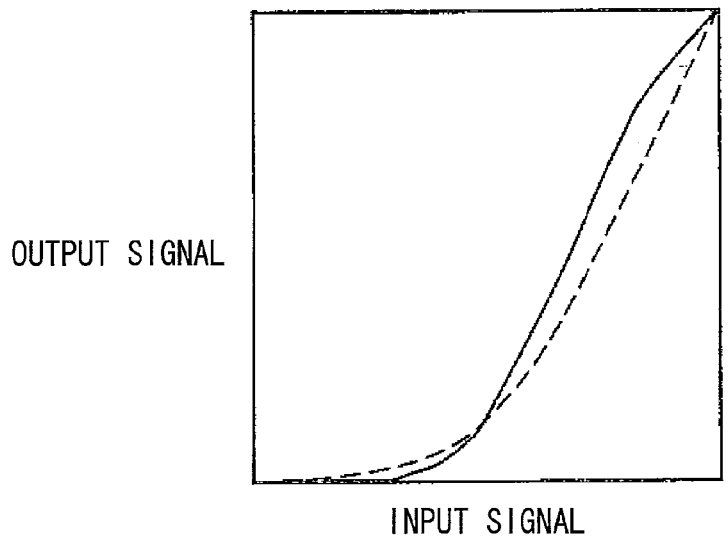

The output tone correction section 17 receives the image data from the enlarging/reducing section 16 and performs output gamma correction on the image data in accordance with the segmentation class signals. More specifically, in accordance with the segmentation class signals, the output tone correction section 17 selects different gamma curves for different image areas and varies in output gamma correction from one image area to another. For example, for nontext areas, the output tone correction section 17 selects a gamma curve corresponding to the display characteristics of the image display device 104, and for text areas, selects a gamma curve for texts to be sharply displayed. (a) of FIG. 5 shows a gamma curve corresponding to the display characteristics of the image display device 104, and (b) of FIG. 5 shows a solid line representing a gamma curve for texts to be sharply displayed and a dotted line representing a gamma curve corresponding to the display characteristics of the image display device 14. The dotted line is shown for comparison with the gamma curve for texts to be sharply displayed.

In the present embodiment, the output tone correction section 17 selects between the gamma curves in accordance with the segmentation class signals. However, the output tone correction section 17 may perform output tone correction by using only the gamma curve of (a) of FIG. 5, instead of making selection in accordance with the segmentation class signals.

Then, the halftone generation section 18 performs no processing on the R'G'B' image data sent from the output tone correction section 17 and passes the image data directly on to the subsequent image display device 104. This allows the image display device 104 to display, in accordance with the R'G'B' image data, a preview of an image to be copied.

It should be noted that in place of the output tone correction section 17, the image-quality adjustment section 11 may execute output gamma correction.

(1-3) As to Whether the Blocks Operate or Do Not Operate

As described above, at the time of printing in the full-color mode, the image-quality adjustment section 11 through the halftone generation section 18 all operate except for the two-color printing process section 12 (see FIG. 1). Meanwhile, at the time of a preview display in the full-color mode, the image-quality adjustment section 11 through the halftone generation section 18 all operate except for the two-color printing process section 12, the black generation and under color removal section 14, and the halftone generation section 18 (see FIG. 3).

Further, at the time of printing in the two-color mode, the image-quality adjustment section 11 through the halftone generation section 18 all operate except for the color correction section 13 (see (b) of FIG. 2). Meanwhile, at the time of a preview display in the two-color mode, the image-quality adjustment section 11 through the halftone generation section 18 all operate except for the black generation and under color removal section 14 and the halftone generation section 18 (see (b) of FIG. 4).

Furthermore, at the time of printing in the single-color mode, the image-quality adjustment section 11 through the halftone generation section 18 all operate except for the two-color printing process section 12, the color correction section 13, and the black generation and under color removal section 14 (see (a) of FIG. 2). Meanwhile, at the time of a preview display in the single-color mode, the image-quality adjustment section 11 through the halftone generation section 18 all operate except for the two-color printing process section 12, the black generation and under color removal section 14, and the halftone generation section 18 (see (a) of FIG. 4).

(1-4) Steps of a Process

Next, an example of steps of a process in the copy mode and the full-color mode is described with reference to FIG. 6. FIG. 6 is a flow chart showing an example of steps of a process that is performed by the image forming apparatus in the copy mode and the full-color mode.

In response to a pressing of a start key (YES in S1) in the copy mode, the image forming apparatus 100 generates RGB analog signals by scanning a document (S2). It is assumed here that prior to the pressing of the start key in S1, the user inputs setting information indicating whether or not a preview display is necessary and thereby sets whether or not the image forming apparatus 100 performs a preview display.

After S2, the image forming apparatus 100 converts the RGB analog signals into RGB image data (digital data) (S3), subjects the RGB image data to shading correction (S4), and then subjects the RGB image data to input gamma correction (S5). After S5, the image forming apparatus 100 performs a document type discrimination process and a segmentation process in accordance with the RGB image data (S6), and then stores the RGB image in the storage device 107 (S7).

After S7, the image forming apparatus 100 judges whether or not it has been set to "Preview Display: Yes" (S8). In cases where it has not been set to "Preview Display: Yes", the image forming apparatus 100 executes Steps S9 through S16. In cases where it has been set to "Preview Display: Yes", the image forming apparatus 100 executes Steps S17 through S23. In the following, Steps S9 through S16 are described first, and then Steps S17 through S23 are described.

In cases where the image forming apparatus 100 has not been set to "Preview Display: Yes" (NO in S8), the image forming apparatus 100 reads out the RGB image data from the storage device 107, and then performs an image-quality adjustment process such as background removal correction and adjustment of intensity (S9). After that, the image forming apparatus 100 converts the RGB image data, which conforms to the characteristics of the scanner, into CMY image data conforming to the characteristics of the printer (S10), and then converts the CMY image data into CMYK image data (S11). After that, the image forming apparatus 100 performs a spatial filter process on the CMYK image data in accordance with a result of the segmentation process (S12), and then performs an enlarging/reducing process on the CMYK image data (S13). After S13, the image forming apparatus 100 performs output gamma correction and a tone reproduction process on the CMYK image data (S14, S15), prints an image of the image data on a sheet of paper (S16), and then finishes the process.

In cases where the image forming apparatus 100 judges, in S8, that it has been set to "Preview Display: Yes" (YES in S8), the image forming apparatus 100 reads out the RGB image data from the storage device 107, and then performs the same image-quality adjustment process as in S9 (S17). After that, the image forming apparatus 100 converts the RGB image data, which conforms to the characteristics of the scanner, into R'G'B' image data conforming to the characteristics of the display device (S18). After S18, the image forming apparatus 100 performs a spatial filter process on the R'G'B' image data in accordance with a result of the segmentation process (S19), and then performs a down-sampling process on the R'G'B' image data so that the R'G'B' image data conforms to the resolution and size of the display (S20). After S20, the image forming apparatus 100 performs output gamma correction on the R'G'B' image data in accordance with the result of the segmentation process (S21). After S21, the image forming apparatus 100 performs a preview display in accordance with the R'G'B' image data (S22). Then, after S22, upon receiving, from the user, a command indicating permission of printing (YES in S23), the image forming apparatus 100 again reads out the RGB image data from the storage device 107, and then performs printing by executing Steps S9 through S16 in accordance with the image data. On the other hand, after S22, upon receiving, from the user, a command indicating cancellation of printing (NO in S23), the image forming apparatus 100 finishes the process.

(2) Facsimile Transmission Mode (2-1) Transmission Process (Image Transmission Job)

Figure 7:
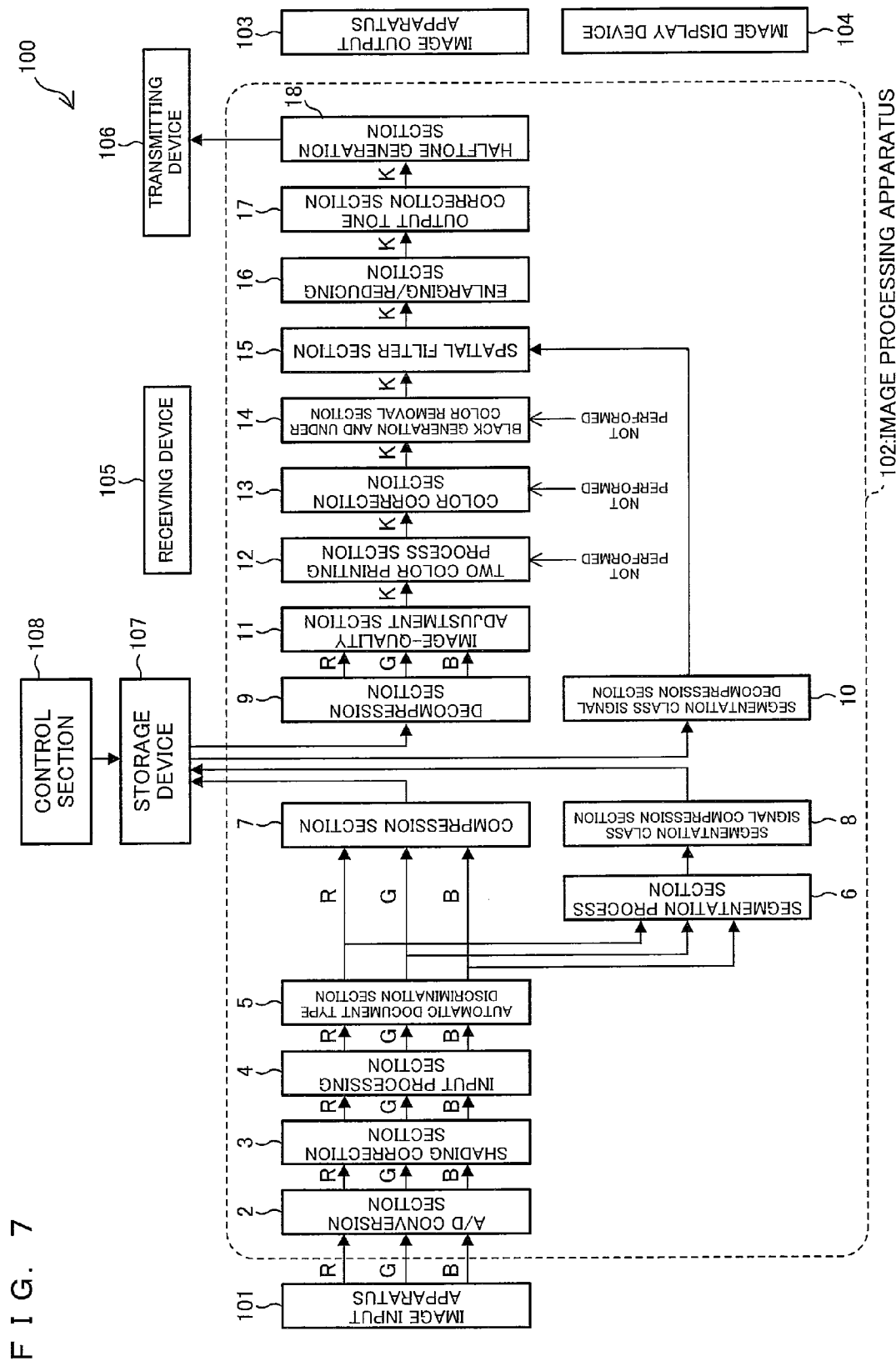
FIG. 7 is a block diagram showing the image forming apparatus of the present embodiment and showing the flow of image data in a transmission process in a facsimile transmission mode.

FIG. 7 is a block diagram showing the same image forming apparatus 100 as in FIG. 1 and showing the flow of image data in a transmission process in the facsimile transmission mode. It should be noted that because the A/D conversion section 2, the shading process section 3, the input processing section 4, the automatic document type discrimination section 5, the segmentation process section 6, the compression section 7, the segmentation class signal compression section 8, and the decompression section 9 performs the same processes as in the case of the copy mode, such processes will not be described below.

In the facsimile transmission mode, the segmentation class signal decompression section 10 reads out the segmentation class signal codes from the storage device 107, decompresses the segmentation class signal codes, and then transmits the decompressed (decoded) segmentation class signal codes to the spatial filter section 15.

The image-quality adjustment section 11 receives the RGB image data from the decompression section 9 and converts the RGB image into K image data (a value indicating grayscale). It should be noted that this conversion is performed by using a predetermined matrix of coefficients and Eq. (2) below:

$$\text{Luminance (Value of K Image Data)} = 0.299r + 0.587g + 0.114b \qquad \text{Eq. (2)}$$

where r is the value (density) of red image data, g is the value of green image data, and b is the value of blue image data.

The two-color printing process section 12, the color correction section 13, and the black generation and under color removal section 14 perform no processing on the K image data (signal) sent from the image-quality adjustment section 11 and pass the K image data directly on to the subsequent spatial filter section 15.

The spatial filter section 15 performs a spatial filter process (e.g., edge enhancement process, smoothing process) on the K image data by a digital filter in accordance with the segmentation class signals. The enlarging/reducing section 16 performs an enlarging/reducing process on the K image data in accordance with the transmission resolution. The output tone correction section 17 performs output gamma correction (gamma correction for output onto a recording medium such as a sheet of paper) on the K image data sent from the enlarging/reducing section 16. The halftone generation section 18 converts the K image data into binarized image data, for example, by error diffusion. Then, the binarized image data are rotated by a rotation process section (not shown) as needed, compressed by a compression/decompression section (not shown) into a predetermined form, and then stored in a memory (not shown).

After that, the transmitting device (e.g., modem) 106 performs a procedure for transmission to the destination and ensures transmittability to the destination. Then, the transmitting device 106 reads out the binarized image data, stored in the memory, with the binarized image data compressed in the predetermined form, subjects the binarized image data to necessary processes such as a conversion in compression format, and then transmits the binarized image data in sequence via a communication line.

(2-2) Preview Display

Figure 8:
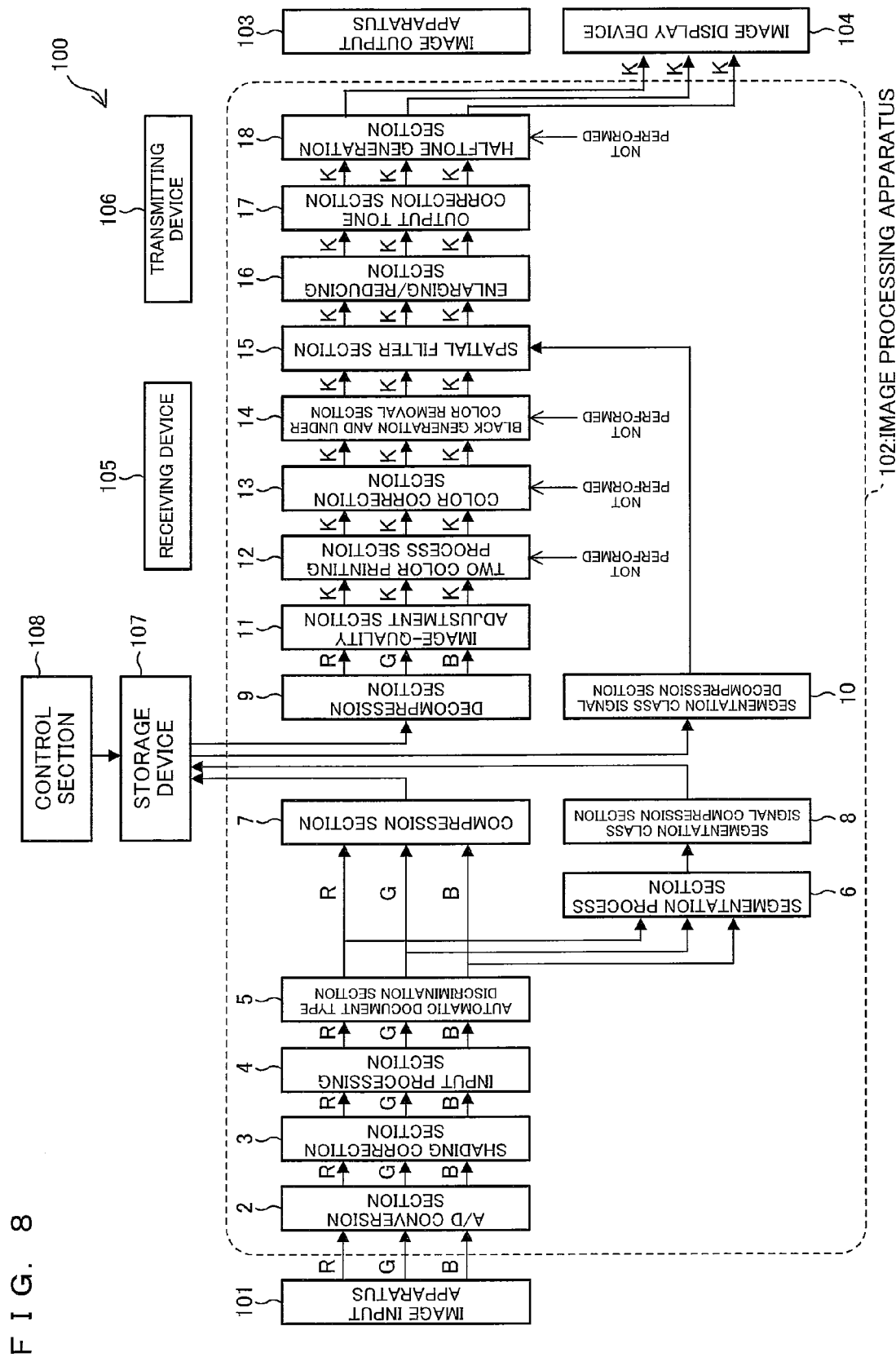
FIG. 8 is a block diagram showing the image forming apparatus of the present embodiment and showing the flow of image data in a preview display process in the facsimile transmission mode.

FIG. 8 is a block diagram showing the same image forming apparatus 100 as in FIG. 1 and showing the flow of image data in a preview display process in the facsimile transmission mode. The term "preview display in the facsimile transmission mode" here means a process of displaying a preview of an image to be transmitted by facsimile.

At the time of a preview display, the A/D conversion section 2, the shading correction section 3, the input processing section 4, the automatic document type discrimination section 5, the segmentation process section 6, the compression section 7, the segmentation class signal compression section 8, the decompression section 9, the segmentation class signal decompression section 10, the image-quality adjustment section 11, and the spatial filter section 15 perform the same processes as in the case of a facsimile transmission process; therefore, such processes are not described. Further, as in the case of a facsimile transmission process, the two-color printing process section 12, the color correction section 13, and the black generation and under color removal section 14 do not perform any processes.

However, at the time of a preview display, unlike in the case of a transmission process, as shown in FIG. 8, three pieces of K image data (all being equal in value) are transmitted for each pixel all the way from the image-quality adjustment section 11 to the image display device 104. This is because the image display device 104 is a full-color model and as such requires three values (pieces of image data) for one pixel.

The enlarging/reducing section 16 performs a downsampling process on the K image data so that the number of pixels of an image composed of the K image data sent from the spatial filter section 15 conforms to the number of pixels of the display size of the image display device 104. Further, the enlarging/reducing section 16 enlarges or reduces the image in accordance with an enlarging/reducing command (information indicating the zoom ratio of a display, e.g., a fixed zoom ratio of 2 to 4 times) inputted from the operation panel (not shown) provided in the image forming apparatus 100.

The output tone correction section 17 receives the K image data from the enlarging/reducing section 16 and performs gamma correction on the K image data in conformity to the display characteristics of the image display device 104. Then, the halftone generation section 18 performs no processing on the K image data sent from the output tone correction section 17 and passes the K image data directly on to the subsequence image display device 104. This allows the image display device 104 to display, in accordance with the K image data, a preview of an image to be transmitted by facsimile.

Further, at the time of a preview display process in the facsimile transmission mode, the image-quality adjustment section 11 converts the RGB image data into three pieces of K image data. However, there is no such limitation in embodiment. For example, it is possible to perform image processing without converting RGB image data into K image data up to the output tone correction section 17, to receive the RGB image data from the output tone correction section 17, and to convert the RGB image data into K image data by a browser.

(2-3) As to Whether the Blocks Operate or Do Not Operate

As described above, at the time of a transmission process in the facsimile transmission mode, the image-quality adjustment section 11 through the halftone generation section 18 all operate except for the two-color printing process section 12, the color correction section 13, and the black generation and under color removal section 14 (see FIG. 7). Meanwhile, at the time of a preview display in the facsimile transmission mode, the image-quality adjustment section 11 through the halftone generation section 18 all operate except for the two-color printing process section 12, the color correction section 13, the black generation and under color removal section 14, and the halftone generation section 18 (see FIG. 8).

(2-4) Steps of a Process

Next, an example of steps of a process in the facsimile transmission mode is described. In cases where the image forming apparatus 100 receives a fax transmission command from the user with the image forming apparatus 100 having not been set to "Preview Display: Yes", the image forming apparatus 100 processes image data as shown in FIG. 7 and transmits the image data to an external apparatus.

Meanwhile, in cases where the image forming apparatus 100 receives a fax transmission command from the user with the image forming apparatus 100 set to "Preview Display: Yes", the image forming apparatus 100 processes image data as shown in FIG. 8, thereby storing the image data in the storage device 107 and displaying a preview of an image of the image data on the image display device 104. Then, when the image forming apparatus 100 receives a transmission permission command from the user with the preview being displayed, the image forming apparatus 100 reads out the image data from the storage device 107, processes the image data in the decompression section 9 through the halftone generation section 18 as shown in FIG. 7, and transmits the image data to an external apparatus via the transmitting device 106.

(3) Facsimile Reception Mode (3-1) Printing Process (Image Print Job)

Figure 9:
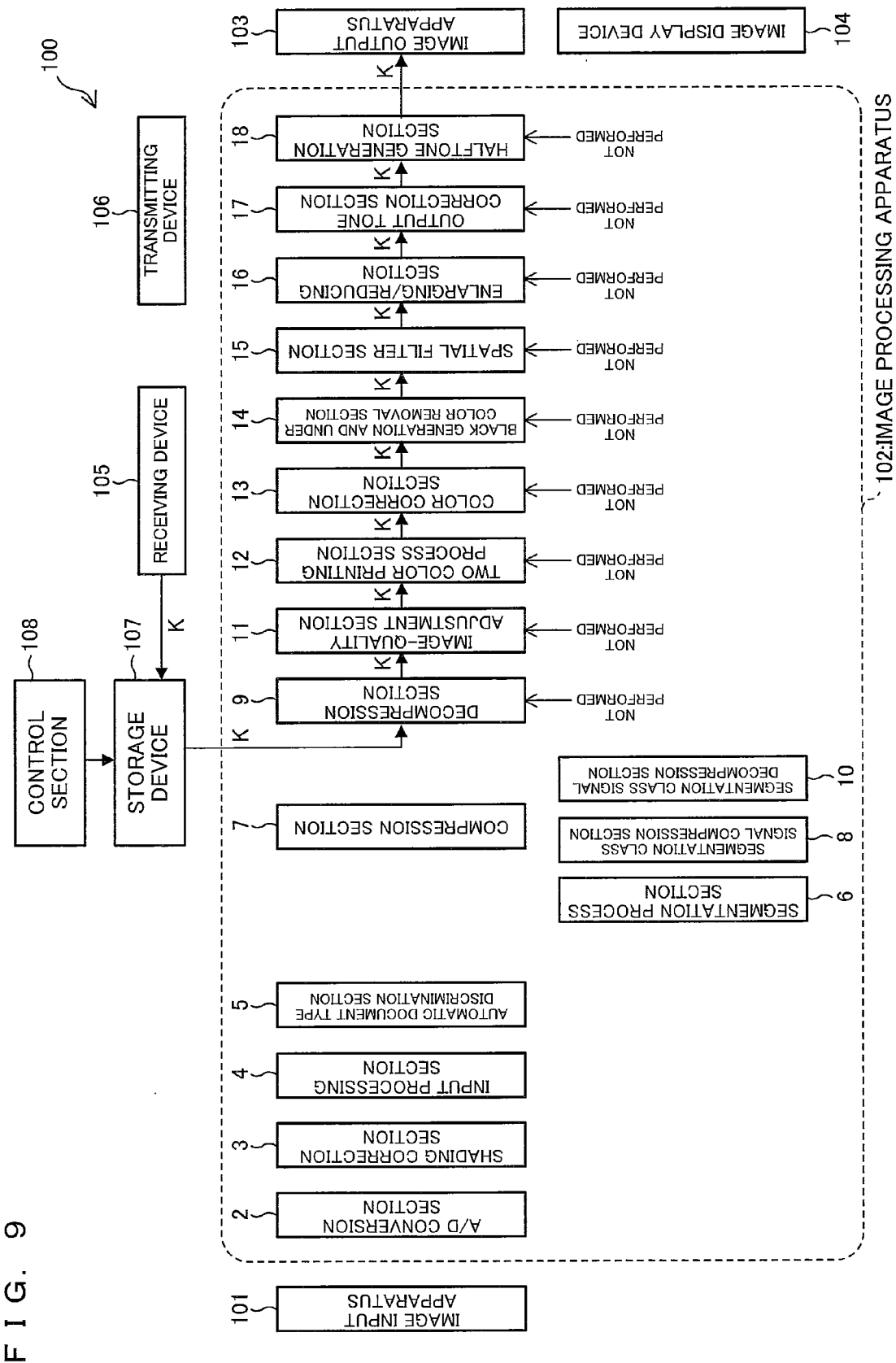
FIG. 9 is a block diagram showing the image forming apparatus of the present embodiment and showing the flow of image data in a printing process in a facsimile reception mode.

FIG. 9 is a block diagram showing the same image forming apparatus 100 as in FIG. 1 and showing the flow of image data in a printing process in the facsimile reception mode.

In the case of facsimile reception, the receiving device 105 receives K image data (1 bit) from the source while performing a communication procedure. Then, the K image data received by the receiving device 105 are decompressed by the compression/decompression section (not shown), rotated by the rotation process section (not shown) as needed, and then subjected to a resolution conversion process by a resolution conversion section (not shown). After that, the image data are stored temporarily in the storage device 107.

Furthermore, the image data written in the storage device 107 are passed on to the decompression section 9 of the image processing apparatus 102 by the control section 108. The decompression section 9, the image-quality adjustment section 11, the two-color printing process section 12, the color correction section 13, the black generation and under color removal section 14, the spatial filter section 15, the enlarging/reducing section 16, the output tone correction section 17, and the halftone generation section 18 perform no processing on the image data sent from the storage device 107 and pass the image data directly onto the subsequent image output apparatus 103. The image output apparatus 103 forms an image on a recording medium (e.g., a sheet of paper) in accordance with the K image data sent from the halftone generation section 18. In the case of a printing process in the facsimile reception mode, image processing is not performed as described above. Therefore, the image data stored in the storage device 107 may be outputted directly to the image output apparatus 103.

(3-2) Preview Display

Figure 10:
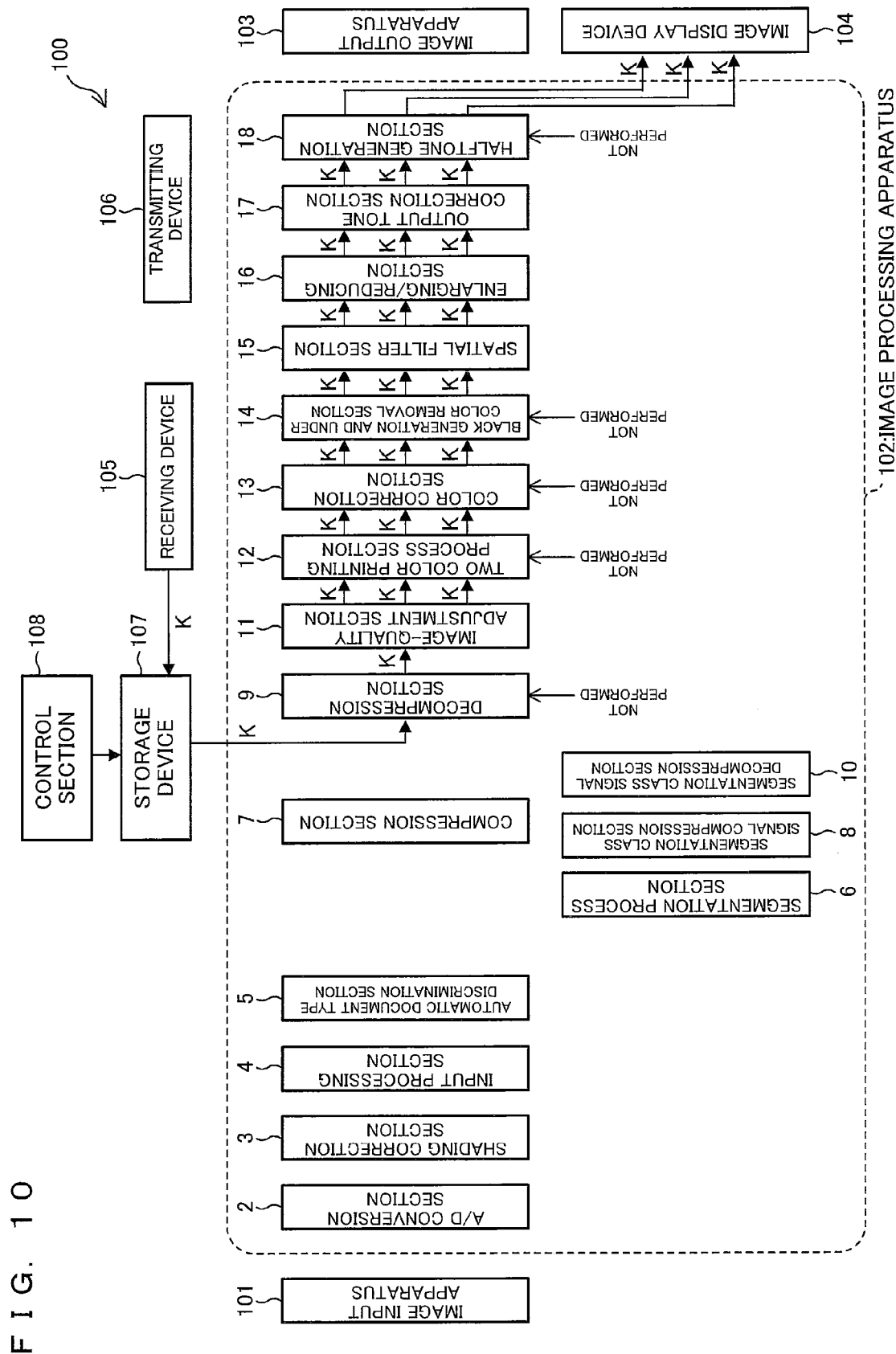
FIG. 10 is a block diagram showing the image forming apparatus of the present embodiment and showing the flow of image data in a preview display process in the facsimile reception mode.

FIG. 10 is a block diagram showing the same image forming apparatus 100 as in FIG. 1 and showing the flow of image data in a preview display process in the facsimile reception mode. The term "preview display in the facsimile reception mode" here means a process of, before printing an image of image data received by facsimile, displaying a preview of the image to be printed.

Also at the time of a preview display in the facsimile reception mode, as in the case of a printing process in the facsimile reception mode, the image data written in the storage device 107 are passed on to the decompression section 9 of the image processing apparatus 102 by the control section 108. The decompression section 9 performs no processing on the image data sent from the storage device 107 and passes the image data on to a bit-number conversion process section (not shown). Then, the bit-number conversion process section converts the number of bits of the image data sent from the decompression section 9 (e.g., from 1 bit to 8 bits), and then passes the image data on to the image-quality adjustment section 11. That is, although not shown in FIG. 10, the decompression section 9 and the image-quality adjustment section 11 has the bit-number conversion section provided therebetween.

As shown in FIG. 10, for each pixel, the image-quality adjustment section 11 receives one piece of K image data and generates and outputs three pieces of K image data (all being equal in value). This is because the image display device 104 is a full-color model and as such requires three values for one pixel.

After that, the two-color printing process section 12, the color correction section 13, and the black generation and under color removal section 14 perform no processing on the K image data sent from the image-quality adjustment section 11 and pass the image data directly on the subsequent spatial filter section 15. The spatial filter section 15 performs a blur (smoothing) process and the like on the K image data with use of a digital filter.

The enlarging/reducing section 16 performs a downsampling process on the K image data so that the number of pixels of an image of the K image data sent from the spatial filter section 15 conforms to the number of pixels of the display size of the image display device 104. Further, the enlarging/reducing section 16 enlarges or reduces the image in accordance with an enlarging/reducing command (information indicating the zoom ratio of a display, e.g., a fixed zoom ratio of 2 to 4 times) inputted from the operation panel (not shown) provided in the image forming apparatus 100.

The output tone correction section 17 receives the K image data from the enlarging/reducing section 16 and performs output gamma correction on the K image data in conformity to the display characteristics of the image display device 104. Then, the halftone generation section 18 performs no processing on the K image data sent from the output tone correction section 17 and passes the K image data directly on to the subsequence image display device 104. This allows the image display device 104 to display, in accordance with the K image data, a preview of an image received by facsimile.

(3-3) As to Whether the Blocks Operate or Do Not Operate

As described above, at the time of a printing process in the facsimile reception mode, the image-quality adjustment section 11 through the halftone generation section 18 do not operate (see FIG. 9). Meanwhile, at the time of a preview display in the facsimile reception mode, the image-quality adjustment section 11 through the halftone generation section 18 all operate except the two-color printing process section 12, the color correction section 13, the black generation and under color removal section 14, and the halftone generation section 18 (see FIG. 10).

(3-4) Steps of a Process

Next, an example of steps of a process in the facsimile reception mode is described. In cases where the image forming apparatus 100 receives image data by facsimile, the received image data are written temporarily in the storage device 107. It should be noted here that there is a time lag between the writing of the image data in the storage device 107 and printing of an image. In cases where the user inputs a "preview command" during the time lag, the image data is processed along such a flow as shown in FIG. 10, and a preview of an image of the image data is displayed by the image display device 104. Further, when the image is printed, the image data is processed along such a flow as shown in FIG. 9, and the image of the image data is printed by the image output apparatus 103.

(4) Image Transmission Mode (4-1) Transmission Process (Image Transmission Job)

In the case of execution of a transmission process by the image forming apparatus 100 in the image transmission mode, the image input apparatus 101, the A/D conversion section 2, the shading correction section 3, the input processing section 4, the automatic document type discrimination section 5, the segmentation process section 6, the compression section 7, the segmentation class signal compression section 8, and the decompression section 9 performs the same processes as in the case of the copy mode. It should be noted that the segmentation class signal decompression section 10 supplies the segmentation class signals to the spatial filter section 15 and the output tone correction section 17.

Then, the image-quality adjustment section 11 performs a background removal process and color balance adjustment. The color correction section 13 converts the image data into R"G"B" image data (e.g., sRGB data) conforming to the display characteristics of a commonly-used display device. The spatial filter section 15 performs a spatial filter process (edge enhancement process, smoothing process) by a digital filter in accordance with the segmentation class signals. The enlarging/reducing section 16 enlarges or reduces the image. Further, the output tone correction section 17 performs correction on a text area with use of the gamma curve of (b) of FIG. 5, and performs correction on a nontext area with use the gamma curve of (a) of FIG. 5, for example. The two-color printing process section 12 and the black generation and under color removal section 14 perform no processing on the input image data, and each of the blocks passes the image data directly on to the subsequent block. Therefore, the output tone correction section 17 outputs the R"G"B" image data.

Furthermore, the R"G"B" image data from the output tone correction section 17 are converted into an image file such as a PDF file by a format conversion process section (not shown). Then, in the scan to e-mail mode, which is an image transmission mode, the image file is attached to an e-mail by the mail processing section (job apparatus; not shown), and the e-mail is transmitted to the destination via a network. Alternatively, in the scan to ftp mode, which is another image transmission mode, the image file is transmitted to a predetermined folder. Alternatively, in the scan to usb mode, which is the other image transmission mode, the image file is transmitted to a predetermined USB memory.

(4-2) Preview Display

In the case of execution of a preview display the image forming apparatus 100 in the image transmission mode, the image input apparatus 101, the A/D (analog/digital) conversion section 2, the shading correction section 3, the input processing section 4, the automatic document type discrimination section 5, the segmentation process section 6, the compression section 7, the segmentation class signal compression section 8, the decompression section 9, the segmentation class signal decompression section 10, the image-quality adjustment section 11, and the two-color printing process section 12 perform the same processes as in the case of transmission in the image transmission mode.

Then, at the time of a preview display in the image transmission mode, the color correction section 13 converts the RGB image data into R'G'B' image data conforming to the color space of the image display device 104.

After that, as in the case of transmission, the spatial filter section 15 performs a spatial filter process (edge enhancement process, smoothing process) by a digital filter in accordance with the segmentation class signals. The enlarging/reducing section 16 performs a downsampling process for a match in size for the image display device 104. Further, the output tone correction section 17 performs correction on a text area with use of the gamma curve of (b) of FIG. 5, and performs correction on a nontext area with use the gamma curve of (a) of FIG. 5, for example.

Then, the output tone correction section 17 supplies the R'G'B' image data to the image display device 104, and the image display device 104 performs a preview display in accordance with the R'G'B' image data.

(5) Modification

In the image forming apparatus 100 of FIG. 1, the compressed image data (encoded codes) and the segmentation class signal codes are stored in the storage device 107 in association with one another. However, as in an image forming apparatus 100*a* of FIG. 11, there may be such an arrangement that: after the image input apparatus 101 reads image data, the image data are encoded and stored temporarily in the storage device 107 before a segmentation process and an automatic document type discrimination process; and the image data are read out from the storage device 107, decompressed, and then subjected to a segmentation process and an automatic document type discrimination process.

Further, the image forming apparatus 100 of FIG. 1 may be capable of executing an image filing mode (image filing job) during a job such as the copy mode, the printer mode, the facsimile transmission mode, the facsimile reception mode, or the image transmission mode. The image filing mode is a mode in which to create an image file (e.g., JPEG or TIFF file), during a job such as the copy mode, in accordance with image data obtained by the image input apparatus 101 or image data received from outside and store the image file in the storage device 107.

At the time of filing in the image filing mode, the image data obtained by the image input apparatus 101 or the image data received from outside are converted into an image file (e.g., JPEG or TIFF file) by the image processing apparatus 102. The image filed is sent to a filing processing section (job apparatus; not shown). The filing processing section stores the image file in the storage device 107.

Further, in the case of a preview during each job (e.g., the copy mode, the print mode, or the facsimile transmission mode), the image data obtained by the image input apparatus 101 or the image data received from outside are processed by the image processing apparatus 102, and then sent to the image display device 104, regardless of the execution of the image filing mode. Furthermore, in the case of a preview during each job, the image processing apparatus 102 executes the same image processing regardless of the execution of the image filing mode. For example, at the time of a preview display in the copy mode, the image processing apparatus 102 performs such processes as shown in FIG. 3, regardless of the execution of the image filing mode. Further, at the time of a preview display in the facsimile transmission mode, the image processing apparatus 102 performs such processes as shown in FIG. 8, regardless of the execution of the image filing mode.

(6) Advantages of the Image Processing Apparatus of the Present Embodiment

The image processing apparatus 102 of the present embodiment supplies image data to the image output apparatus (job apparatus, printing apparatus) 103, which performs a print job (copy mode, print mode), and supplies the image data to the image display device 104 so that the image display device 104 displays a preview before the execution of the print job.

Moreover, the image processing apparatus 102 includes a first image processing section which performs first image processing on image data to be supplied to the image output apparatus 103, and a second image processing section which performs second image processing on image data to be supplied to the image display device 104, the second image processing being different from the first image processing, and which performs the first image processing and the second image processing with use of a common circuit area. An example of the first image processing section is the color correction section 13 in the copy mode and the full-color mode. This is because the color correction section 13 uses a common circuit area for a process of conversion from RGB into CMY (first image processing) and a process of conversion from RGB into R'G'B' (second image processing).

This brings about a merit of reducing the circuit size of an image processing circuit even in an image processing apparatus that performs image processing for a printing process or the like and image processing for a preview before the printing process.

Further, in the present embodiment, at the time of printing in the copy mode and the full-color mode, the color correction section 13 performs a process by which additive image data (RGB) read by the scanner and conforming to the characteristics of the scanner are converted into subtractive image data (CMY) conforming to the characteristics of the image output apparatus 103. Meanwhile, at the time of a preview in the copy mode and the full-color mode, the color correction section 13 performs a process by which the additive image data (RGB) read by the scanner and conforming to the characteristics of the scanner are converted into additive image data (R'G'B') conforming to the characteristics of the image display device 104. That is, at the time of a preview display, the additive image data conforming to the characteristics of the scanner are converted directly into the image data conforming to the characteristics of the image display device 104. Therefore, at the time of a preview display in the copy mode and the full-color mode, the image processing apparatus 102 of the present embodiment performs a single nonlinear conversion from the RGB image data into the R'G'B' image data, but does not perform a plurality of nonlinear conversions as in the arrangement of Japanese Patent Application Publication, Tokukaihei, 9-135316 A (1997), thus making it possible to suppress accumulation of errors in conversion and suppress deterioration in color reproducibility. In Japanese Patent Application Publication, Tokukaihei, 9-135316 A (1997), a total of four conversions are performed, namely the conversion from RGB data into CMY data, the conversion from CMY data into CMYK data, the conversion from CMYK data into CMY data, and the conversion from the CMY data into RGB data, which result in accumulation of errors in conversion and deterioration in color reproducibility.

Further, at the time of a preview in the copy mode and the single-color mode or at the time of a preview in the copy mode and the two-color mode, the present embodiment performs such a nonlinear conversion, but the number of such nonlinear conversions is only two. Therefore, it is possible to better suppress deterioration in color reproducibility than in the arrangement of Japanese Patent Application Publication, Tokukaihei, 9-135316 A (1997), in which a total of four nonlinear conversions are performed.

Furthermore, in the present embodiment, at the time of printing in the copy mode and the full-color mode, the black generation and under color removal section 14 converts CMY image into CMYK image data; meanwhile, at the time of a preview display in the copy mode and the full-color mode, the black generation and under color removal section 14 performs no processing on R'G'B' and outputs R'G'B' directly. This makes it possible to simplify the circuit arrangement by using a common image data path in the image processing circuit for printing image data that needs to be converted from CMY into CMYK and preview image data that does not need to be subjected to a black generation and under color removal process.

The image processing apparatus 102 of the present embodiment can perform image processing based on a result of judgment by the automatic document type discrimination section 5, image processing based on a result of processing by the segmentation process section 6, and a background removal process. The effects of these processes are reflected in a preview image that is displayed by the image display device 104.

(7) Automatic Document Type Discrimination Section 5

The automatic document type discrimination section 5 can determine the type of a document according to a technique described, for example, in Japanese Patent Application Publication, Tokukai, No. 2002-232708 A. This technique is executed as below in (A) to (G).

(A) The minimum and maximum values of density in a block of n×m (e.g., 7×15) including the target pixel is calculated.

(B) The maximum density difference is calculated with use of the minimum and maximum values of density thus calculated.

(C) A total sum of busyness of density (e.g., a sum of values calculated along a main scanning direction and a sub-scanning direction), which is a total sum of absolute values of density difference among adjacent pixels, is calculated.

(D) A comparison between the maximum density difference thus calculated and a maximum density difference threshold value and a comparison between the total sum of busyness of density thus calculated and a threshold value for the total sum of busyness of density are made. If such conditions are met that Maximum Density Difference<Maximum Density Difference Threshold Value and Total Sum of Busyness of Density<Threshold Value for the Total Sum of Busyness of Density, the target pixel is judged as belonging to a background/photograph area. If the conditions are not met, the target pixel is judged as belonging to a text/halftone dot area.

(E) The target pixel judged as belonging to a background/photograph area is judged as belonging to a background area if such a condition is met that Maximum Density Difference<Threshold Value for Background/photograph Judgment, or as belonging to a photograph area if the condition is not met.

(F) The target pixel judged as belonging to a text/halftone dot area is judged as belonging to a text area if such a condition is met that Total Sum of Busyness of Density< (Maximum Density Difference×Threshold Value for Text/halftone Dot Judgment), or as belonging to a halftone dot area if the condition is not met.

(G) The number of pixels in each of the background, photograph, text, halftone dot areas is counted, and the type of the document as a whole is determined by making comparisons between the counted values and threshold values for the background, photograph, text, halftone dot areas. For example, when it is assumed that a text, a halftone dot, and a photographic picture are arranged in descending order of detection accuracy, the document is judged as a text document when the number of pixels in the text area accounts for not less than 30% of the total number of pixels, as a halftone dot document (printed-picture document) when the number of pixels in the halftone dot area accounts for not less than 20% of the total number of pixels, or as a photographic-picture document when the number of pixels in the photographic-picture area accounts for not less than 10% of the total number of pixels. Alternatively, the document is judged as a text/halftone dot document (text/printed-picture document) when the ratio of the document area and the ratio of the halftone dot area are not less than the respective threshold values.

[Embodiment 2]

Normally, the resolution of a display image in a display device is lower than the resolution of an input image in a scanner. Therefore, also in the image forming apparatus of FIGS. 1 through 10, the resolution of the image display device (display device) 104 is lower than the resolution of the image input apparatus 101.

Accordingly, at the time of a preview mode in the copy mode or the facsimile transmission mode, the enlarging/reducing section (adjustment process section) 16 performs a downsampling process on input image data so that the resolution (number of pixels) of an input image is matched to the resolution (number of pixels) of the image display device 104. In other words, the resolution of the image display device 104 takes on a steady value, and the resolution of the image input apparatus 101 takes on a steady value; but since the resolution of the image display device 104 is lower than the resolution of the image input apparatus 101, the enlarging/reducing section 16 performs a downsampling process on input image data. In the present embodiment, while the resolution of the image display device 104 is 75 dpi, the resolution of the image input apparatus 101 is 600 dpi; therefore, the enlarging/reducing section 16 performs a downsampling process on image data of 600 dpi so that the image data becomes image data of 75 dpi.

Furthermore, in the present embodiment, in performing a process of enlarging or reducing a display image, the user can input a display zoom ratio with which a zoom ratio is set for the enlarging or reducing process, and the enlarging/reducing section 16 performs a downsampling process on image data so that the image display device 104 displays an image whose size corresponds to the display zoom ratio. The term "display zoom ratio" here means a value that is set according to Eq. (3) below. That is, the display zoom ratio is 2.0 when the display image size is twice as large as the input image size, and the display zoom ratio is 3.0 when the display image size is three times as large as the input image size. However, the display zoom ratio may be expressed in percentage. In such a case, the display zoom ratio is set according to Eq. (4) below. Moreover, in cases where the display zoom ratio is expressed in percentage, the display zoom ratio is 200% when the display image size is twice as large as the input image size, and the display zoom ratio is 300% when the display image size is three times as large as the input image size.

$$\text{Display Zoom Ratio} = \text{Display Image Size}/\text{Input Image Size} \quad \text{Eq. (3)}$$

$$\text{Display Zoom Ratio (\%)} = 100 \times \text{Display Image Size}/\text{Input Image Size} \quad \text{Eq. (4)}$$

where the input image size means the length along the main scanning direction of an image that is scanned by the image input apparatus 101. Moreover, the input image size can be calculated by dividing (i) the number of pixels along the main scanning direction (i.e., a direction orthogonal to the direction of movement of the line sensor and parallel to the platen) of an image that is scanned by the image input apparatus 101 by (ii) the resolution of the image input apparatus 101 along the main scanning direction. Meanwhile, the display image size means the length along a direction corresponding to the main scanning direction in a display image that is displayed by the image display device 104. Moreover, the display image size can be calculated by dividing (i) the number of pixels along the direction corresponding to the main scanning direction in the display image by (ii) the resolution of the image display device 104 along the direction corresponding to the main scanning direction.

It should be noted that the display image size also means the size of an image of image data subjected to a downsampling process in the enlarging/reducing section 16, and the input image size also means the size of an image of image data yet to be subjected to a downsampling process in the enlarging/reducing section 16. That is, the display zoom ratio corresponds to a value indicative of the proportion of the size of an image of image data after a downsampling process to the size of the image of the image data before the downsampling process.

In the foregoing arrangement, the enlarging/reducing section 16 adjusts the amount of data to be downsampled in the downsampling process, in order that the size of an image whose preview is displayed by the image display device 104 corresponds to the display zoom ratio. Moreover, the amount of data to be downsampled in the downsampling process is adjusted so that as the display zoom ratio increases, the amount of data to be downsampled in the downsampling process becomes smaller, and that as the display zoom ratio decreases, the amount of data to be downsampled in the downsampling process becomes larger.

For example, in cases where the display zoom ratio is 1.0 (i.e., in cases where the display zoom ratio is 100%), the scanned image is equal in size to the display image. This makes it necessary for the enlarging/reducing section 16 to decrease the resolution of the image from 600 dpi to 75 dpi while maintaining the size of the image, which means the amount of data (total number of pixels) of the image is downsampled to 75/600.

Further, in cases where the display zoom ratio is 2.0 (i.e., in cases where the display zoom ratio is 200%), the display image is twice as large in size as the scanned image. This makes it necessary for the enlarging/reducing section 16 to decrease the resolution of the image from 600 dpi to 75 dpi while making the size of the image twice as large, which means the amount of data (total number of pixels) of the image is downsampled to 2×75/600.

Further, in cases where the display zoom ratio is 3.0 (i.e., in cases where the display zoom ratio is 300%), the display image is three times as large in size as the scanned image. This makes it necessary for the enlarging/reducing section 16 to decrease the resolution of the image from 600 dpi to 75 dpi while making the size of the image three times as large, which means the amount of data (total number of pixels) of the image is downsampled to 3×75/600.

As described above, the enlarging/reducing section 16 adjusts the amount of data to be downsampled in the downsampling process, in order that as the display zoom ratio increases, the amount of data to be downsampled in the downsampling process becomes smaller, and that as the display zoom ratio decreases, the amount of data to be downsampled in the downsampling process becomes larger.

Further, the image processing apparatus 102 of the present embodiment performs a segmentation process on image data and performs image processing (first image processing) that varies according to the content of the segmentation process. Therefore, in the enlarging/reducing section 16, the image data are not downsampled with interpolation (e.g., a bilinear or bicubic interpolation), but need to be simply downsampled without interpolation. Moreover, in the case of a high degree of downsampling (a large amount of data to be downsampled) in a downsampling process without an interpolation process, image processing reflecting the result of a segmentation process causes a lack of image information in some pixels, thus causing deterioration in image quality as a result.

Accordingly, in the present embodiment, the image processing apparatus 102 executes the following processes (H) to (M). It should be noted that the copy mode in each of the following processes (H) to (M) serves to describe the content of processing in the full-color mode, not the content of processing in the single-color or two-color mode.

(H) At the time of a printing process (output process) in the copy mode, the image-quality adjustment section 11 through the halftone generation section 18 perform the same processes as in the case of a printing process in the copy mode of Embodiment 1. That is, the spatial filter section 15, the black generation and under color removal section 14, and the halftone generation section 18 among the group (image processing section) of the image-quality adjustment section 11 through the halftone generation section 18 perform first image processing that varies according to the result of a segmentation process.

(I) At the time of a transmission process (output process) in the facsimile transmission mode, the image-quality adjustment section 11 through the halftone generation section 18 perform the same processes as in the case of a transmission process in the facsimile transmission mode of Embodiment 1. That is, the spatial filter section 15 among the group (image processing section) of the image-quality adjustment section 11 through the halftone generation section 18 performs first image processing that varies according to the result of a segmentation process.

(J) At the time of a preview display in the copy mode with the display zoom ratio being not less than a threshold value, the same processes are performed as in the case of a preview display in the copy mode of Embodiment 1. That is, the spatial filter section 15 and the output tone correction section 17 among the group (image processing section) of the image-quality adjustment section 11 through the halftone generation section 18 performs first image processing that varies according to the result of a segmentation process.

(K) At the time of a preview display in the facsimile transmission mode with the display zoom ratio being not less than the threshold value, the same processes are performed as in the case of a preview display in the facsimile transmission mode of Embodiment 1. That is, the spatial filter section 15 among the group (image processing section) of the image-quality adjustment section 11 through the halftone generation section 18 performs first image processing that varies according to the result of a segmentation process.

(L) At the time of a preview display in the copy mode with the display zoom ratio being less than the threshold value, the image-quality adjustment section 11 through the halftone generation section 18 except for the spatial filter section 15 and the output tone correction section 17 perform the same processes as in the case of a preview display in the copy mode of Embodiment 1. Moreover, the spatial filter section 15 and the output tone correction section 17 perform second image processing irrelevant to the result of a segmentation process. That is, the group (image processing section) of the image-quality adjustment section 11 through the halftone generation section 18 does not perform first image processing that varies according to the result of a segmentation process.

(M) At the time of a preview display in the facsimile transmission mode with the display zoom ratio being less than the threshold value, the image-quality adjustment section 11 through the halftone generation section 18 except for the spatial filter section 15 perform the same processes as in the case of a preview display in the facsimile transmission mode of Embodiment 1. Moreover, the spatial filter section 15 performs second image processing irrelevant to the result of a segmentation process. That is, the group (image processing section) of the image-quality adjustment section 11 through the halftone generation section 18 does not perform first image processing that varies according to the result of a segmentation process.

Then, the threshold value is set so that: when a degree of downsampling in the downsampling process is not higher than a predetermined reference level, first image processing that varies according to the result of a segmentation process is performed; and when the degree of downsampling in the downsampling process is higher than the predetermined reference level, first image processing that varies according to the result of a segmentation process is not performed. In the present embodiment, it is assumed that when the amount of data (number of pixels) of image data after downsampling is less than ¼ of the amount of data of image data before downsampling, the degree of downsampling is higher than the predetermined reference level. Moreover, because when the display zoom ratio is less than 200% the amount of data (number of pixels) of image data after downsampling is less than ¼ of the amount of data of image data before downsampling, the threshold value is set to 200% in the present embodiment.

Further, in each of the foregoing processes (H) to (K), the first image processing that is realized by the spatial filter section 15 is to perform a sharpening process on a text image area using a sharpening filter and a smoothing process on a halftone dot image area using a smoothing filter (blurring filter). On the other hand, in each of the foregoing processes (L) and (M), the second image processing that is realized by the spatial filter section 15 is to perform a smoothing process on all image areas regardless of the type of image area.

Furthermore, in the foregoing process (J), the first image processing that is realized by the output tone correction section 17 is to perform tone correction on a text image area according to the gamma curve of (b) of FIG. 5 and tone correction on an image area other than the text image area according to the gamma curve of (a) of FIG. 5. On the other hand, in the foregoing process (L), the second image processing that is realized by the output tone correction section 17 is to perform tone correction on all image areas according to the gamma curve of (b) of FIG. 5 regardless of the type of image area.

Examples of techniques for executing the foregoing processes (H) to (M) include Examples 1 to 5 below. It should be noted that the copy mode in each of Examples 1 to 5 below serves to describe the content of processing in the full-color mode, not the content of processing in the single-color or two-color mode.

Example 1

Example 1 is a technique which, in the arrangements of FIGS. 1, 3, 7, and 8, reads out segmentation class signal codes (segmentation information) from the storage device (storage section) 107 at the time of a printing process in the copy mode, at the time of a transmission process in the facsimile transmission mode, or at the time of a preview display in the copy mode or facsimile transmission mode with the display zoom ratio being not less than the threshold value, and which does not read out the segmentation class signal codes from the storage device 107 at the time of a preview display in the copy mode or facsimile transmission mode with the display zoom ratio being less than the threshold value. This technique is detailed below.

In the case of input of an operation command (operation signal) indicative of an instruction to execute a printing process in the copy mode, an instruction to execute a transmission process in the facsimile transmission mode, or an instruction to execute a preview display process in the copy mode or facsimile transmission mode with the display zoom ratio being not less than the threshold value, the control section (information readout section) 108 reads out the segmentation class signal codes from the storage device 107 and passes them on to the segmentation class signal decompression section 10.

Thus, at the time of a printing process in the copy mode, at the time of a transmission process in the facsimile transmission mode, and at the time of a preview display in the copy mode or facsimile transmission mode with the display zoom ratio being not less than the threshold value, the segmentation class signal decompression section 10 outputs segmentation class signals. Moreover, at the time of a printing process in the copy mode, the segmentation class signals can be inputted to the black generation and under color removal section 14, the spatial filter section 15, and the halftone generation section 18. At the time of a preview display in the copy mode with the display zoom ratio being not less than the threshold value, the segmentation class signals can be inputted to the spatial filter section 15 and the output tone correction section 17. Alternatively, at the time of a transmission process in the facsimile transmission mode or at the time of a preview display in the facsimile transmission mode with the display zoom ratio being not less than the threshold value, the segmentation class signals can be inputted to the spatial filter section 15.

This makes it possible, at the time of a printing process in the copy mode, at the time of a transmission process in the facsimile transmission mode, or at the time of a preview display in the copy mode or facsimile transmission mode with the display zoom ratio being not less than the threshold value, that each component having received the segmentation class signals performs first image processing that varies according to the result of a segmentation process.

Alternatively, in the case of input of an operation command indicative of an instruction to execute a preview process in the copy mode or facsimile transmission mode with the display zoom ratio being less than the threshold value, the control section 108 does not read out the segmentation class signal codes from the storage device 107.

Thus, at the time of a preview display in the copy mode or facsimile transmission mode with the display zoom ratio being less than the threshold value, the segmentation class signal decompression section 10 does not output segmentation class signals. Accordingly, no segmentation class signals are inputted to any one of the image-quality adjustment section 11 through the halftone generation section 18. Therefore, at the time of a preview display in the copy mode or facsimile transmission mode with the display zoom ratio being less than the threshold value, none of the components of the image processing apparatus 102 performs first image processing that varies according to the result of a segmentation process.

Moreover, the spatial filter section 15 is configured to, at the time of a preview display in the copy mode or facsimile transmission mode with the display zoom ratio being less than the threshold value, perform a smoothing process on all image areas regardless of the type of image area. Further, the output tone correction section 17 is configured to, at the time of a preview display in the copy mode with the display zoom ratio being less than the threshold value, perform tone correction on all image areas according to the gamma curve of (b) of FIG. 5 regardless of the type of image area.

Figure 12:
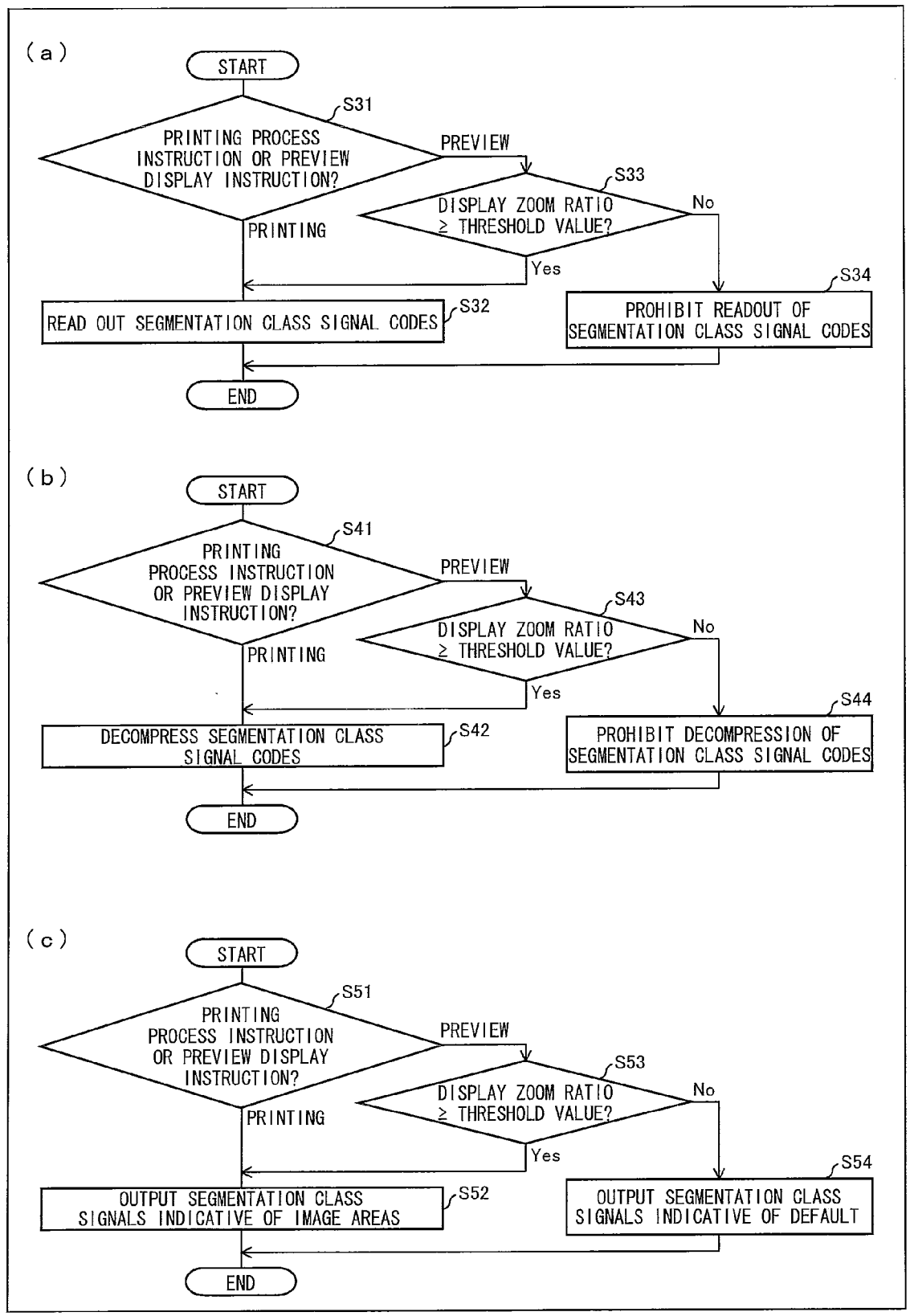
FIG. 12 shows (a) a flow chart showing steps of a process that is performed by a control section of Example 1, (b) a flow chart showing steps of a process that is performed by a segmentation class signal decompression section of Example 2, and (c) a flow chart showing steps of a process that is performed by a segmentation class signal decompression section of Example 3.

Next, steps of a process that is performed by the control section 108 in the present example are described. (a) of FIG. 12 is a flow chart showing steps of a process that is performed by the control section 108 at the time of the copy mode in the present example. As shown in (a) of FIG. 12, upon receiving the operation command, the control section 108 judges whether the operation command indicates a printing process instruction or a preview display instruction (S31). Then, when it is judged, in S31, that the operation command indicates a printing process instruction, the control section 108 reads out the segmentation class signal codes from the storage device 107 (S32), and the segmentation class signal codes thus read out are passed on to the segmentation class signal decompression section 10. Alternatively, when it is judged, in S31, that the operation command indicates a preview display instruction, the control section 108 judges whether or not the display zoom ratio is not less than the threshold value (200%) (S33). When it is judged, in S33, that the display zoom ratio is not less than the threshold value, the control section 108 reads out the segmentation class signal codes from the storage device 107 (S32), and the segmentation class signal codes thus read out are passed on to the segmentation class signal decompression section 10. When it is judged, in S33, that the display zoom ratio is smaller than the threshold value, the control section 108 does not read out the segmentation class signal codes from the storage device 107 (S34), and then finishes the process. This makes it possible to prohibit input of the segmentation class signals to the spatial filter section 15 and the output tone correction section 17 at the time of a preview display process in the copy mode with the display zoom ratio being smaller than the threshold value, and causes the spatial filter section 15 and the output tone correction section 17 to perform second image processing irrelevant to the result of a segmentation process, instead of performing first image processing that varies according to the result of a segmentation process.

Example 2

Example 2 is a technique which, at the time of a printing process in the copy mode, at the time of a transmission process in the facsimile transmission mode, or at the time of a preview display in the copy mode or facsimile transmission mode with the display zoom ratio being not less than the threshold value in the arrangements of FIGS. 1, 3, 7, and 8, decompresses the segmentation class signal codes read out from the storage device, and which, at the time of a preview display in the copy mode or facsimile transmission mode with the display zoom ratio being less than the threshold value, does not decompress the segmentation class signal codes read out from the storage device 107. This technique is detailed below.

In the case of input of an operation command indicative of an instruction to execute a printing process in the copy mode, the segmentation class signal decompression section (segmentation information decompression section) 10 decompresses segmentation class signal codes read out from the storage device 107 and sends them to the black generation and under color removal section 14, the spatial filter section 15, and the halftone generation section 18. Alternatively, in the case of input of an operation command indicative of an instruction to execute a preview process in the copy mode with the display zoom ratio being not less than the threshold value, the segmentation class signal decompression section 10 decompresses the segmentation class signal codes read out from the storage device 107 and sends them to the spatial filter section 15 and the output tone correction section 17. Furthermore, in the case of input of an operation command indicative of an instruction to execute a transmission process in the facsimile transmission mode or an instruction to execute a preview process in the facsimile transmission mode with the display zoom ratio being not less than the threshold value, the segmentation class signal decompression section 10 decompresses the segmentation class signal codes read out from the storage device 107 and sends them to the spatial filter section 15.

Thus, at the time of a printing process in the copy mode, at the time of a transmission process in the facsimile transmission mode, and at the time of a preview display in the copy mode or facsimile transmission mode with the display zoom ratio being not less than the threshold value, the segmentation class signal decompression section 10 decompresses the segmentation class signal codes. Moreover, at the time of a printing process in the copy mode, the segmentation class signals can be inputted to the black generation and under color removal section 14, the spatial filter section 15, and the halftone generation section 18. At the time of a preview display in the copy mode with the display zoom ratio being not less than the threshold value, the segmentation class signals can be inputted to the spatial filter section 15 and the output tone correction section 17. Alternatively, at the time of a transmission process in the facsimile transmission mode or at the time of a preview display in the facsimile transmission mode with the display zoom ratio being not less than the threshold value, the segmentation class signals can be inputted to the spatial filter section 15.

This makes it possible, at the time of a printing process in the copy mode, at the time of a transmission process in the facsimile transmission mode, or at the time of a preview display in the copy mode or facsimile transmission mode with the display zoom ratio being not less than the threshold value, that each component having received the segmentation class signals performs first image processing that varies according to the result of a segmentation process.

Further, the segmentation class signal decompression section 10 is configured to, in the case of input of an operation command indicative of an instruction to execute a preview display process in the copy mode or facsimile transmission mode with the display zoom ratio being smaller than the threshold value, neglect to decompress the segmentation class signal codes read out from the storage device 107 and thereby neglect to output segmentation class signals (i.e., neglect to operate).

Thus, at the time of a preview display in the copy mode or facsimile transmission mode with the display zoom ratio being less than the threshold value, the segmentation class signal decompression section 10 does not output segmentation class signals. Accordingly, no segmentation class signals are inputted to any one of the image-quality adjustment section 11 through the halftone generation section 18. Therefore, at the time of a preview display in the copy mode or facsimile transmission mode with the display zoom ratio being less than the threshold value, none of the components of the image processing apparatus 102 performs first image processing that varies according to the result of a segmentation process.

Moreover, the spatial filter section 15 is configured to, at the time of a preview display in the copy mode or facsimile transmission mode with the display zoom ratio being less than the threshold value, perform a smoothing process on all image areas regardless of the type of image area. Further, the output tone correction section 17 is configured to, at the time of a preview display in the copy mode with the display zoom ratio being less than the threshold value, perform tone correction on all image areas according to the gamma curve of (b) of FIG. 5 regardless of the type of image area.

Next, steps of a process that is performed by the segmentation class signal decompression section 10 in at the time of the copy mode in the present example are described. (b) of FIG. 12 is a flow chart showing steps of a process that is performed by the segmentation class signal decompression section 10 at the time of the copy mode in the present example.

As shown in (b) of FIG. 12, upon receiving the operation command, the segmentation class signal decompression section 10 judges whether the operation command indicates a printing process instruction or a preview display instruction (S41). Then, when it is judged, in S41, that the operation command indicates a printing process instruction, the segmentation class signal decompression section 10 decompresses the segmentation class signal codes read out from the storage device 107 (S42), and the segmentation class signals obtained by the decompression are sent to the black generation and under color removal section 14, the spatial filter section 15, and the halftone generation section 18. Alternatively, when it is judged, in S41, that the operation command indicates a preview display instruction, the segmentation class signal decompression section 10 judges whether or not the display zoom ratio is not less than the threshold value (S43). When it is judged, in S43, that the display zoom ratio is not less than the threshold value, the segmentation class signal decompression section 10 decompresses the segmentation class signal codes read out from the storage device 107 (S42), and the segmentation class signals obtained by the decompression are sent to the spatial filter section 15 and the output tone correction section 17. On the other hand, when it is judged, in S43, that the display zoom ratio is smaller than the threshold value, the segmentation class signal decompression section 10 does not decompress the segmentation class signal codes read out from the storage device 107 (S44), and then finishes the process. This makes it possible to prohibit input of the segmentation class signals to the spatial filter section 15 and the output tone correction section 17 at the time of a preview display process in the copy mode with the display zoom ratio being smaller than the threshold value, and causes the spatial filter section 15 and the output tone correction section 17 to perform second image processing irrelevant to the result of a segmentation process, instead of performing first image processing that varies according to the result of a segmentation process.

Example 3

Example 3 is a technique in which, at the time of a printing process in the copy mode, at the time of a transmission process in the facsimile transmission mode, or at the time of a preview display in the copy mode or facsimile transmission mode with the display zoom ratio being not less than the threshold value in the arrangements of FIGS. 1, 3, 7, and 8, the segmentation class signal decompression section 10 outputs segmentation class signals indicative of image areas for each pixel (signals indicative of the result of a segmentation process), and in which, at the time of a preview display in the copy mode or facsimile transmission mode with the display zoom ratio being smaller than the threshold value, the segmentation class signal decompression section 10 outputs segmentation class signals indicative of default (signals not indicative of the result of a segmentation process). This technique is detailed below.

In the case of input an operation command indicative of an instruction to execute a printing process in the copy mode, the segmentation class signal decompression section (segmentation information decompression section) 10 decompresses segmentation class signal codes read out from the storage device 107 and sends them to the black generation and under color removal section 14, the spatial filter section 15, and the halftone generation section 18. Alternatively, in the case of input of an operation command indicative of an instruction to execute a preview process in the copy mode with the display zoom ratio being not less than the threshold value, the segmentation class signal decompression section 10 decompresses the segmentation class signal codes read out from the storage device 107 and sends them to the spatial filter section 15 and the output tone correction section 17. Furthermore, in the case of input of an operation command indicative of an instruction to execute a transmission process in the facsimile transmission mode or an instruction to execute a preview process in the facsimile transmission mode with the display zoom ratio being not less than the threshold value, the segmentation class signal decompression section 10 decompresses the segmentation class signal codes read out from the storage device 107 and sends them to the spatial filter section 15.

This makes it possible to input the segmentation class signals to the black generation and under color removal section 14, the spatial filter section 15, and the halftone generation section 18 at the time of a printing process in the copy mode, and to input the segmentation class signals to the spatial filter section 15 and the output tone correction section 17 at the time of a preview display in the copy mode. Further, it is possible to input the segmentation class signals to the spatial filter section 15 at the time of a transmission process in the facsimile transmission mode or at the time of a preview display in the facsimile transmission mode with the display zoom ratio being not less than the threshold value.

This makes it possible, at the time of a printing process in the copy mode, at the time of a transmission process in the facsimile transmission mode, or at the time of a preview display in the copy mode or facsimile transmission mode with the display zoom ratio being not less than the threshold value, that each component having received the segmentation class signals performs first image processing that varies according to the result of a segmentation process.

Meanwhile, in the case of input of an operation command indicative of an instruction to execute a preview process in the copy mode with the display zoom ratio being smaller than the threshold value, the segmentation class signal decompression section 10 ignores the segmentation class signal codes read out from the storage device 107 and transmits the segmentation class signals indicative of default to the spatial filter section 15 and the output tone correction section 17 for each pixel. Alternatively, in the case of input of an operation command indicative of an instruction to execute a preview process in the facsimile transmission mode with the display zoom ratio being smaller than the threshold value, the segmentation class signal decompression section 10 ignores the segmentation class signal codes read out from the storage device 107 and transmits the segmentation class signals indicative of default to the spatial filter section 15 for each pixel. The "segmentation class signals indicative of default" here mean signals indicating that they do not belong to any image area.

Thus, at the time of a preview process in the copy mode with the display zoom ratio being smaller than the threshold value, the spatial filter section 15 and the output tone correction section 17 receive segmentation class signals (default signal) identical in content for all pixels regardless of the type of image area. Alternatively, at the time of a preview process in the facsimile transmission mode with the display zoom ratio being smaller than the threshold value, the spatial filter section and the output tone correction section 17 receive segmentation class signals (default signal) identical in content for all pixels regardless of the type of image area. Therefore, none of the components of the image processing apparatus 102 performs first image processing that varies according to the result of a segmentation process.

Moreover, the spatial filter section 15 is configured to, upon receiving the segmentation class signals indicative of default, perform a smoothing process on all image areas regardless of the type of image area. Further, the output tone correction section 17 is configured to, upon receiving the segmentation class signals indicative of default, perform tone correction on all image areas according to the gamma curve of (b) of FIG. 5 regardless of the type of image area.

Next, steps of a process that is performed by the segmentation class signal decompression section 10 in at the time of the copy mode in the present example are described. (c) of FIG. 12 is a flow chart showing steps of a process that is performed by the segmentation class signal decompression section 10 at the time of the copy mode in the present example.

As shown in (c) of FIG. 12, upon receiving the operation command, the segmentation class signal decompression section 10 judges whether the operation command indicates a printing process instruction or a preview display instruction (S51). Then, when it is judged, in S51, that the operation command indicates a printing process instruction, the segmentation class signal decompression section 10 decompresses the segmentation class signal codes read out from the storage device 107, and the segmentation class signals obtained by the decompression are sent to the black generation and under color removal section 14, the spatial filter section 15, and the halftone generation section 18 (S52). Alternatively, when it is judged, in S51, that the operation command indicates a preview display instruction, the control section 108 judges whether or not the display zoom ratio is not less than the threshold value (S53). When it is judged, in S53, that the display zoom ratio is not less than the threshold value, the segmentation class signal decompression section 10 decompresses the segmentation class signal codes read out from the storage device 107, and the segmentation class signals obtained by the decompression are sent to the spatial filter section 15 and the output tone correction section 17 (S52). When it is judged, in S53, that the display zoom ratio is smaller than the threshold value, the segmentation class signal decompression section 10 ignores the segmentation class signal codes read out from the storage device 107 and outputs the default segmentation class signals to the spatial filter section 15 and the output tone correction section 17 for all pixels (S54). Thus, at the time of a preview display process in the copy mode with the display zoom ratio being smaller than the threshold value, second image processing irrelevant to the result of a segmentation process is performed instead of first image processing that varies according to the result of a segmentation process.

It should be noted that the segmentation class signal decompression section 10 may transmit dummy signals to the spatial filter section 15 and the output tone correction section 17 for all pixels in the case of input of an operation command indicative of an instruction to execute a preview process in the copy mode with the display zoom ratio being smaller than the threshold value, instead of transmitting the segmentation class signals indicative of default. Alternatively, the segmentation class signal decompression section 10 may transmit dummy signals to the spatial filter section 15 for all pixels in the case of input of an operation command indicative of an instruction to execute a preview process in the facsimile transmission mode with the display zoom ratio being smaller than the threshold value, instead of transmitting the segmentation class signals indicative of default. Moreover, the spatial filter section 15 is configured to, upon receiving the dummy signals, perform a smoothing process on all image areas regardless of the type of image area. Further, the output tone correction section 17 is configured to, upon receiving the dummy signals, perform tone correction on all image areas according to the gamma curve of (b) of FIG. 5 regardless of the type of image area. This makes it possible for the spatial filter section 15 and the output tone correction section 17 to, at the time of a preview display with the display zoom ratio being smaller than the threshold value, perform image processing irrelevant to the result of a segmentation process, instead of performing image processing that varies according to the result of a segmentation process. The "dummy signals" here do not mean signals indicative of image areas but means signals that make no sense.

Figure 11:
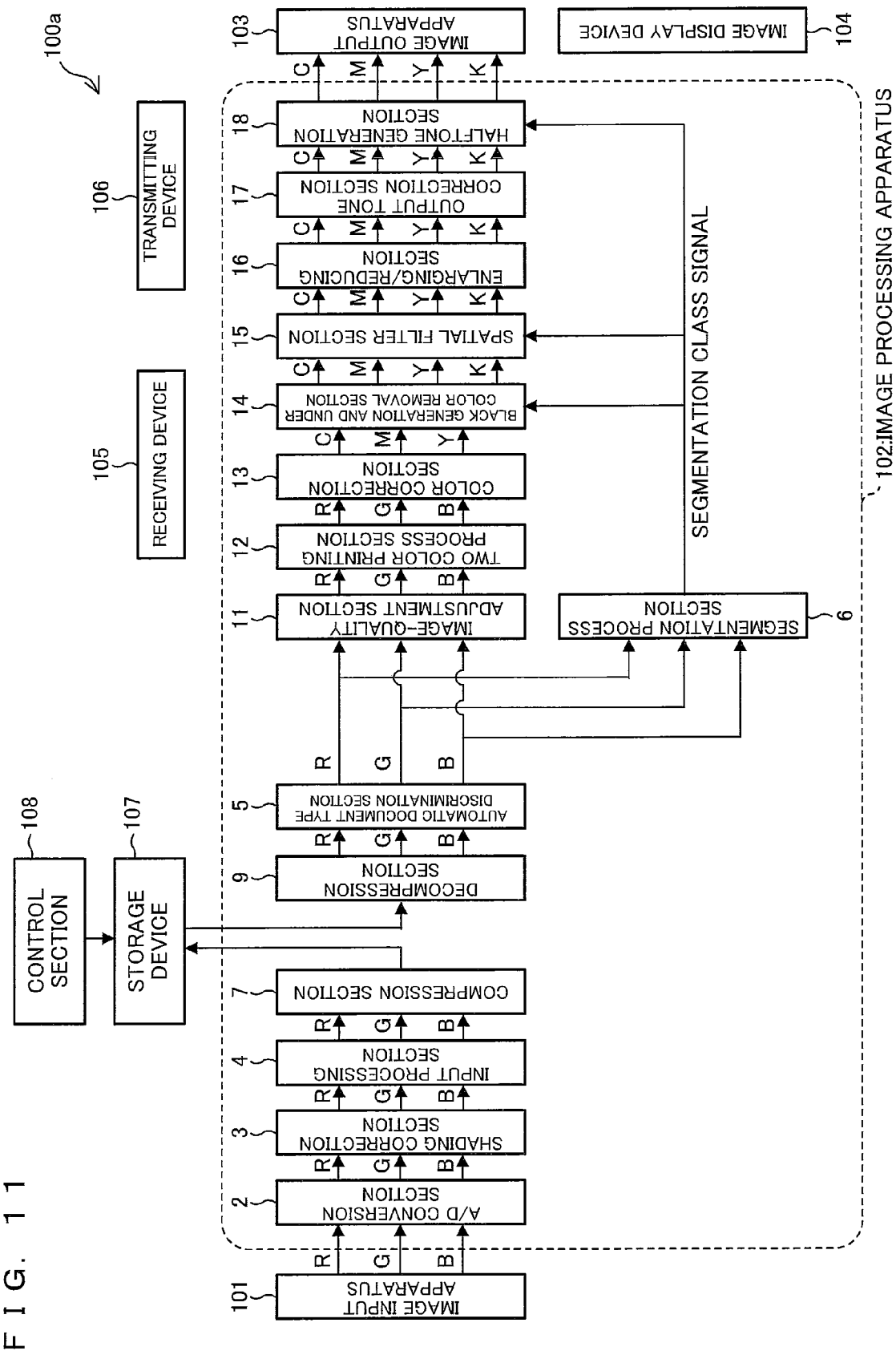
FIG. 11 is a block diagram showing a modification of the image forming apparatus of the present embodiment.

Further, the technique of Example 3 can be applied to an arrangement of FIG. 11. The following describes an example of the copy mode where the technique of Example 3 is applied to the arrangement of FIG. 11. In the case of input of an instruction to execute a printing process in the copy mode, the segmentation process section 6 performs a segmentation process for each pixel, and then transmits segmentation class signals indicative of image areas to the black generation and under color removal section 14, the spatial filter section 15, and the halftone generation section 18. Alternatively, in the case of input of an operation command indicative of an instruction to execute a preview process in the copy mode with the display zoom ratio being not less than the threshold value, the segmentation process section 6 performs a segmentation process for each pixel, and then transmits segmentation class signals indicative of image areas to the spatial filter section 15 and the output tone correction section 17. Alternatively, in the case of input of an operation command indicative of an instruction to execute a preview process in the copy mode the display zoom ratio being smaller than the threshold value, the segmentation process section 6 transmits segmentation class signals indicative of default (or dummy signals) to the spatial filter section 15 and the output tone correction section 17 for all pixels. This makes it possible for the spatial filter section 15 and the output tone correction section 17 to, at the time of a preview display with the display ratio being smaller than the threshold value, perform second image processing irrelevant to the result of a segmentation process, instead of performing first image processing that varies according to the result of a segmentation process.

Example 4

Example 4 is a technique in which, at the time of a printing process in the copy mode, at the time of a transmission process in the facsimile transmission mode, or at the time of a preview display in the copy mode or facsimile transmission mode with the display zoom ratio being not less than the threshold value, the spatial filter section 15 and the like select the contents of image processing according to the received segmentation class signals with reference to the segmentation class signals, and in which, at the time of a preview display in the copy mode or facsimile transmission mode with the display zoom ratio being smaller than the threshold value, the spatial filter section 15 and the like ignore (do not refer to) the received segmentation class signals. The following describes an embodiment in which the technique of Example 4 is applied to the arrangements of FIGS. 1, 3, 7, and 8.

In the case of input of an instruction to execute a printing process in the copy mode, the segmentation class signal decompression section (segmentation information supply section) 10 decompresses segmentation class signal codes read out from the storage device 107 and sends them to the black generation and under color removal section 14, the spatial filter section 15, and the halftone generation section 18. Alternatively, in the case of input of an instruction to execute a transmission process in the facsimile transmission mode, the segmentation class signal decompression section 10 decompresses the segmentation class signal codes read out from the storage device 107 and sends them to the spatial filter section 15. Moreover, at the time of a printing process in the copy mode or at the time of a transmission process in the facsimile transmission mode, each component having received the segmentation class signals performs, with reference to the received segmentation class signals, first image processing that varies in content from one image area to another.

Alternatively, in the case of input of an instruction to execute a preview process in the copy mode, the segmentation class signal decompression section 10 decompresses the segmentation class signal codes read out from the storage device 107 and sends them to the spatial filter section 15 and the output tone correction section 17, regardless of the value of display zoom ratio. Then, when the display zoom ratio is not less than the threshold value, the spatial filter section 15 and the output tone correction section 17 perform, with reference to the received segmentation class signals, first image processing that varies in content from one image area to another. Alternatively, when the display zoom ratio is less than the threshold value, the spatial filter section 15 and the output tone correction section 17 ignore (neglect to refer to) the received segmentation class signals and perform second image processing irrelevant to the result of a segmentation process.

Furthermore, in the case of input of an instruction to execute a preview process in the facsimile transmission mode, the segmentation class signal decompression section 10 decompresses the segmentation class signal codes read out from the storage device 107 and sends them to the spatial filter section 15, regardless of the value of display zoom ratio. Then, when the display zoom ratio is not less than the threshold value, the spatial filter section 15 performs, with reference to the received segmentation class signals, first image processing that varies in content from one image area to another. Alternatively, when the display zoom ratio is less than the threshold value, the spatial filter section 15 ignores (neglects to refer to) the received segmentation class signals and performs second image processing irrelevant to the result of a segmentation process.

Thus, at the time of a preview display with the display zoom ratio being smaller than the threshold value, second image processing irrelevant to the result of a segmentation process is performed instead of first image processing that varies according to the result of a segmentation process.

At the time of a preview display in the copy mode or facsimile transmission mode with the display zoom ratio being smaller than the threshold value, the spatial filter section 15 performs a smoothing process as second image processing on all image areas. Further, at the time of a preview display in the copy mode with the display zoom ratio being smaller than the threshold value, the output tone correction section 17 performs tone correction as second image processing on all image areas according to the gamma curve of (b) of FIG. 5.

It should be noted that the technique of Example 4 can be applied to the arrangement of FIG. 11. However, in the arrangement of FIG. 11, it is not the segmentation class signal decompression section 10 but the segmentation process section 6 that inputs the segmentation class signals to the spatial filter section 15 and the like.

Example 5

Example 5 is a technique which allows the segmentation process section 6 to operate at the time of a printing process in the copy mode, at the time of a transmission process in the facsimile transmission mode, or at the time of a preview display in the copy mode or facsimile transmission mode with the display zoom ratio being not less than the threshold value, and which does not allow it to operate at the time of a preview display in the copy mode or facsimile transmission mode with the display zoom ratio being smaller than the threshold value. This technique is detailed below. It should be noted that the technique of Example 5 can be applied to the arrangement of FIG. 11.

In the case of input of an operation command (operation signal) indicative of an instruction to execute a printing process in the copy mode, an instruction to execute a transmission process in the facsimile transmission mode, or an instruction to execute a preview display process in the copy mode or facsimile transmission mode with the display zoom ratio being not less than the threshold value, the segmentation process section 6 performs a segmentation process in accordance with RGB image data sent from the automatic document type discrimination section 5 and outputs segmentation class signals indicative of a result of the segmentation process. Alternatively, in the case of input of an operation command indicative of an instruction to execute a preview process in the copy mode or facsimile transmission mode with the display zoom ratio being smaller than the threshold value, the segmentation process section 6 does not perform a segmentation process even when receiving RGB image data from the automatic document type discrimination section 5, and does not output segmentation class signals (does not operate), either.

This makes it possible, at the time of a printing process in the copy mode, at the time of a transmission process in the facsimile transmission mode, or at the time of a preview display process in the copy mode or facsimile transmission mode with the display zoom ratio being not less than the threshold value, that each component having received the segmentation class signals performs first image processing that varies in content from one image area to another. On the other hand, at the time of a preview display process in the copy mode or facsimile transmission mode with the display zoom ratio being less than the threshold value, it becomes possible to perform second image processing irrelevant to the result of a segmentation process, instead of performing first image processing that varies according to the result of a segmentation process.

At the time of a preview display in the copy mode or facsimile transmission mode with the display zoom ratio being smaller than the threshold value, the spatial filter section 15 performs a smoothing process as second image processing on all image areas. Further, at the time of a preview display in the copy mode with the display zoom ratio being smaller than the threshold value, the output tone correction section 17 performs tone correction as second image processing on all image areas according to the gamma curve of (b) of FIG. 5.

Modified Example

The input image size according to Eq. (3) above may be the length along the sub-scanning direction (direction of movement of the line sensor) of an image that is scanned by the image input apparatus 101. In this case, the display image size is the length along a direction corresponding to the sub-scanning direction in a display image that is displayed by the image display device 104. Further, in this case, the input image size can be calculated by dividing (i) the number of pixels along the sub-scanning direction of an image scanned by the image input apparatus 101 by (ii) the resolution of the image input apparatus 101 along the sub-scanning direction. Moreover, the display image size can be calculated by dividing (i) the number of pixels along the direction corresponding to the sub-scanning direction in the display image by (ii) the resolution of the image display device 104 along the direction corresponding to the sub-scanning direction.

Further, in the foregoing embodiments, each component of the image processing apparatus 102 is controlled so that: when the display zoom ratio is not less than the threshold value, first image processing that varies according to the result of a segmentation process is performed; and when the display zoom ratio is less than the threshold value, second image processing irrelevant to a segmentation process is performed instead of the first image processing. Such control does not imply any limitation. For example, each component of the image processing apparatus 102 may be controlled so that: when the downsampling rate according to Eq. (5) below is not less than a threshold value, first image processing that varies according to the result of a segmentation process is performed; and when the downsampling rate is less than the threshold value, second image processing irrelevant to a segmentation process is performed instead of the first image processing.

Downsampling Rate=Number of Pixels of Image after Downsampling/Number of Pixels of Image before Downsampling      Eq. (5)

This is because even in this case the first image processing is performed when the degree of downsampling is not higher than the predetermined reference level (i.e., when the downsampling rate is not less than the threshold value) and the second image processing is performed instead of the first image processing when the degree of downsampling is higher than the predetermined reference level (i.e., when the downsampling rate is less than the threshold value).

The present embodiment has omitted an explanation about the image transmission mode. However, as in the copy mode or facsimile transmission mode, it is possible to, at the time of a transmission process (output process) in the image transmission mode or at the time of a preview display in the image transmission mode with the display zoom ratio being not less than the threshold value, perform first image processing that varies according to the result of a segmentation process, and to, at the time of a preview display in the image transmission mode with the display zoom ratio being smaller than the threshold value, perform second image processing irrelevant to the result of a segmentation process, instead of performing first image processing that varies according to the result of a segmentation process. That is, as in the copy mode or facsimile transmission mode, it is possible to apply the techniques of Examples 1 to 5 in the image transmission mode. Moreover, the first image processing that is realized by the spatial filter section 15 is to perform a sharpening process on a text image area and a smoothing process on a halftone dot area. On the other hand, the second image processing that is realized by the spatial filter section 15 is to perform a smoothing process on all image areas regardless of the type of image area.

Although it is assumed, in the present embodiment, that the threshold value to be compared with the display zoom ratio is 200%, the threshold value is of course not limited to 200%. The threshold value may be changed according to the type of document of input image data. In the case of a printed-picture document or a photographic-picture document, it is possible to either raise the threshold value to be compared to the display zoom ratio or perform no first image processing regardless of the value of the display zoom ratio. For example, in cases where a result of document type discrimination by the automatic document type discrimination section 5 indicates a text/printed-picture document or a text/photographic-picture document, the control section 108 sets the threshold value to the default value of 200%. Alternatively, in cases where a result of document type discrimination indicates a printed-picture document or a photographic-picture document, the control section 108 sets the threshold value to 400%.

In the present embodiment, at the time of a printing process in the copy mode, at the time of a transmission process in the facsimile transmission mode, or at the time of a preview display in either of these modes with the display zoom ratio being not less than the threshold value, the spatial filter section 15 performs a sharpening process on a text area and a smoothing process on a halftone dot area. This makes it possible to enhance the contour of a text to enhance legibility, and to suppress moiré in a halftone dot. Meanwhile, at the time of a preview display in the copy mode and the facsimile transmission mode with the display zoom ratio being smaller than the threshold value, the spatial filter section 15 performs a smoothing process using a smoothing filter (blurring filter) regardless of the type of image area. The reason for this is as follows: The inventors studied and found out that a downsampling process that is performed on a blurred image by the enlarging/reducing section 16 at the time of a preview with the display zoom ratio being smaller than the threshold value results in better suppression of degradation in legibility of texts due to downsampling than does a downsampling process that is performed on an unblurred image.

Further, in the present embodiment, at the time of a preview display in the copy mode with the display zoom ratio being smaller than the threshold value, the output tone correction section 17 performs gamma correction using a gamma curve (see (b) of FIG. 5) for texts to be sharply displayed, regardless of the type of image area. This makes it possible to suppress degradation in legibility of texts even when the image is downsampled by the enlarging/reducing section 16.

Further, the process of enlarging or reducing an image whose preview is displayed by the image display device 104 may be executed not by the enlarging/reducing section 16 but by an application (browser) for displaying an image on the image display device 104.

Further, although the present embodiment is arranged for the user to input a value of the display zoom ratio to the image forming apparatus 100, the present embodiment is not limited to such an arrangement. For example, it is possible to set a plurality of levels of the display zoom ratio in advance, let the user select his/her desired level from among the plurality of levels, and display a preview with the display zoom ratio at the level selected.

For example, it is possible to set five levels as indicated below and let the user select his/her desired level from among the five levels.

Level of Enlargement 2: Display Zoom Ratio of 400%
Level of Enlargement 1: Display Zoom Ratio of 200%
Level 0: Display Zoom Ratio of 100%
Level of Reduction 1: Display Zoom Ratio of 50%
Level of Reduction 2: Display Zoom Ratio of 25%

Further, it is possible to display the levels with signs such as "−", "0", and "+" on the image display device 104 and let the user select his/her desired sign from among the signs.

Furthermore, it is possible to let the user select his/her desired level by operating a "+" button and a "−" button displayed on the operation panel (not shown) or the image display device 104. That is, the user uses the "+" button and the "−" button to change the default setting of Level 0 up and down to suit his/her desired level.

The present embodiment can be achieved by storing, in a computer-readable storage medium containing control program code (executable program, intermediate code program, or source program) to be executed by a computer, an image processing method for, when the image data are data for use in printing or facsimile transmission, performing first image processing that varies according to a result of the segmentation process, and for, when the image data are data for use in a preview display, performing a downsampling process on the image data and performing a preview without performing the first image processing. This makes it possible to provide a portable storage medium containing a program for the image processing method.

In the present embodiment, the storage medium may be a memory (not shown) for processing in a microcomputer. For example, the storage medium may be a program medium such as a ROM per se. Alternatively, the storage medium may be a program medium that can read by inserting the storage medium into a program reading device provided as an external storage device (not shown).

In either case, the contained program code may be arranged to be accessible to a microprocessor that will execute the program code. Alternatively, the program code may be arranged to be read and then downloaded to a program storage area (not shown) of the microcomputer. It is assumed that the download program is stored in advance in the main apparatus.

It should be noted here that the program medium is a storage medium arranged to be separable from the main body. The storage medium may be, for example, a tape, such as a magnetic tape or a cassette tape; a magnetic disk, such as a flexible disk or a hard disk, or an optical disk, such as CD-ROM/MO/MD/DVD; a card, such as an IC card (memory card) or an optical card; or a semiconductor memory, such as a mask ROM/EPROM (erasable programmable read-only memory)/EEPROM (electrically erasable programmable read-only memory)/flash ROM. All these storage media hold a program in a fixed manner.

Alternatively, since the present embodiment is a system configuration connectable to communication networks including the Internet, the program medium may be a medium carrying the program code in a flowing manner as in the downloading of a program over a communication network. Further, when the program code is downloaded over a communications network in this manner, the download program may be stored in advance in the main apparatus or installed from another storage medium. The present invention can be realized in the form of a computer data signal, embedded in a carrier wave, in which the program code is embodied electronically. The storage medium is read by a digital color image forming apparatus of a program reading device provided in a computer system, whereby the aforementioned image processing method is executed.

Further, the present embodiment is characterized by an image processing apparatus for performing a downsampling process on image data, and for supplying the image data after the downsampling process to a display device as image data for use in a display, the image processing apparatus including: a segmentation process section which performs a segmentation process on the image data; and an image processing section which performs first image processing that varies according to a result of the segmentation process, when a degree of downsampling in the downsampling process is not higher than a predetermined reference level, the image processing section performing the first image processing on the image data, when the degree of downsampling in the downsampling process is higher than the predetermined reference level, the image processing section neglecting to perform the first image processing on the image data.

The arrangement of the present embodiment performs the first image processing when the degree of downsampling is not higher than the predetermined reference level (i.e., when the amount of data to be downsampled is small), and does not perform the first image processing when the degree of downsampling is higher than the predetermined reference level (i.e., when the amount of data to be downsampled is large). Therefore, there is remarkable deterioration in image quality due to an overhigh degree of downsampling, the present invention supplies the image data to the display device without performing the first image processing. This brings about an advantage of making it possible to suppress deterioration in quality of an image that is displayed in accordance with the image data after the downsampling process.

Further, the arrangement of the present embodiment executes the first image processing when because the first image processing, if performed, does not result in as high a degree of downsampling the deterioration in image quality makes no problem, thus displaying a high-quality image reflecting the result of the segmentation process.

Further, in an image processing apparatus in which a display image is enlarged or reduced, the downsampling process is performed so that the size of the display image corresponds to the display zoom ratio, and the amount of data to be downsampled in the downsampling process is adjusted in accordance with the display zoom ratio. Moreover, as the display zoom ratio increases, the degree of downsampling in the downsampling process becomes lower (the amount of data to be downsampled in the downsampling process becomes smaller), and that as the display zoom ratio decreases, the degree of downsampling in the downsampling process becomes higher (the amount of data to be downsampled in the downsampling process becomes larger).

Accordingly, in addition to the foregoing arrangement, the image processing apparatus of the present embodiment is characterized by further including an adjustment process section which adjusts a size of an image of the image data by performing the downsampling process in accordance with a display zoom ratio indicative of a proportion of the size of the image of the image data after the downsampling process to the size of the image of the image data before the downsampling process, wherein: when the display zoom ratio is not less than a threshold value, the image processing section executes the first image processing, considering that the degree of downsampling in the down sampling process is not higher than the predetermined reference level; and when the display zoom ratio is less than the threshold value, the image processing section does not execute the first image processing, considering that the degree of downsampling in the downsampling process is higher than the predetermined reference level.

Thus, in the image processing apparatus, in which a display image is enlarged or reduced, the necessity of the first image processing is determined in accordance with a zoom ratio (display zoom ratio) for use in the enlarging or reducing process. Further, the foregoing arrangement makes it possible to, when the display image is enlarged, display a high-quality image reflecting the result of the segmentation process, and makes it possible to, when the display image is reduced, suppress deterioration in image quality due to the downsampling process.

It should be noted that the size may be a length of the image along a main scanning direction or a length of the image along a sub-scanning direction.

Further, when the display zoom ratio is not less than the threshold value, the first image processing is executed by the image processing section; therefore, the image processing section needs segmentation information indicative of the result of the segmentation process. However, the display zoom ratio is lower than the threshold value, the first image processing is not performed by the image processing section; therefore, the image processing section does not needs segmentation information indicative of the result of the segmentation process.

Accordingly, in addition to the foregoing arrangement, the image processing apparatus of the present embodiment may be arranged to further include: a storage section in which to store segmentation information indicative of the result of the segmentation process after the segmentation process; and an information readout section which, when the display zoom ratio is not less than the threshold value, reads out the segmentation information from the storage section and inputs the segmentation information to the image processing section, and which, when the display zoom ratio is less than the threshold value, does not read out the segmentation information from the storage section.

Further, in addition to the foregoing arrangement, the image processing apparatus of the present embodiment may be arranged to further include: a segmentation information compression section which compresses segmentation information indicative of the result of the segmentation process after the segmentation process; and a segmentation information decompression section which, when the display zoom ratio is not less than the threshold value, decompresses the compressed segmentation information, and which, when the display zoom ratio is less than the threshold value, does not decompress the compressed segmentation information.

Furthermore, in addition to the foregoing arrangement, the image processing apparatus of the present embodiment may be arranged to further include a segmentation information supply section which supplies segmentation information indicative of the result of the segmentation process to the image processing section when the display zoom ratio is not less than the threshold value, and which supplies dummy information to the image processing section instead of the segmentation information when the display zoom ratio is less than the threshold value.

Further, in addition to the foregoing arrangement, the image processing apparatus of the present embodiment may be arranged to further include a segmentation information supply section which supplies segmentation information indicative of the result of the segmentation process to the image processing section when the display zoom ratio is not less than the threshold value, and which supplies segmentation information not indicative of the result of the segmentation process but indicative of default to the image processing section when the display zoom ratio is less than the threshold value.

When the display zoom ratio is not less than the threshold value, the segmentation information indicative of the result of the segmentation process is supplied to the image processing section. However, there is no problem unless the image processing section refers to the segmentation information.

Accordingly, in addition to the foregoing arrangement, the image processing apparatus of the present embodiment may be arranged to further include: a segmentation information supply section which supplies segmentation information indicative of the result of the segmentation process to the image processing section, wherein: when the display zoom ratio is not less than the threshold value, the image processing section refers to segmentation information supplied from the segmentation information supply section; and when the display zoom ratio is less than the threshold value, the image processing section does not refer to the segmentation information supplied from the segmentation information supply section.

Further, the fact that the first image processing is performed when the display zoom ratio is not less than the threshold value and the first image processing is not performed when the display zoom ratio is less than the threshold value means that while the segmentation process is necessary when the display zoom ratio is not less than the threshold value, the segmentation process is not necessary when the display zoom ratio is less than the threshold value.

Accordingly, the image processing apparatus of the present embodiment may be arranged such that: the segmentation process section performs the segmentation process when the display zoom ratio is not less than the threshold value; and the segmentation process section does not perform the segmentation process when the display zoom ratio is less than the threshold value.

Further, the inventors of the present invention diligently studied to find that degradation in legibility of texts can be suppressed by performing a smoothing process on image data in performing, on the image data, a downsampling process that is large in amount of data to be downsampled. Therefore, it is preferable that the image processing section perform second image processing irrelevant to the segmentation process on the image data when the degree of downsampling in the downsampling process is higher than the predetermined reference level, that the first image processing be performing a sharpening process on a text image area and a smoothing process on a halftone dot image area, and that the second image processing be performing a smoothing process regardless of type of image area. This makes it possible to suppress degradation in legibility of texts even in performing, on image data, a downsampling process that is large in amount of data to be downsampled.

Further, in addition to the foregoing arrangement, the image processing apparatus of the present embodiment may be arranged such that the image processing section performs the first image processing on image data that are supplied to an output apparatus which executes an output process other than a display process and that are used for the output process. The term "output process" here means a process of printing an image of the image data, a process of transmitting the image data by facsimile, or a process of transmitting the image data via a communication network.

Furthermore, such an image processing apparatus as described above may be provided in an image forming apparatus. Further, the present embodiment is characterized by a method for controlling an image processing apparatus for performing a downsampling process on image data, and for supplying the image data after the downsampling process to a display device as image data for use in a display, the image processing apparatus having a segmentation process section which performs a segmentation process on the image data, the method comprising the steps of: when a degree of downsampling in the downsampling process is not higher than a predetermined reference level, performing, on the image data, first image processing that varies according to a result of the segmentation process; and when the degree of downsampling in the downsampling process is higher than the predetermined reference level, neglecting to perform the first image processing.

Each section of the image processing apparatus of the present invention may be realized by a computer. In this case, a control program for operating a computer as each section and a computer-readable storage medium containing such a control program are also encompassed in the scope of the present embodiment.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

An image processing apparatus of the present invention can be used for apparatuses for processing image data and, in particular, for multifunction printers, copying machines, printers, and facsimile machines.

REFERENCE SIGNS LIST

6 Segmentation process section
8 Segmentation class signal compression section (segmentation information compression section)
10 Segmentation class signal decompression section (segmentation information decompression section, segmentation information supply section)
11 Image-quality adjustment section
12 Two-color printing process section 13 Color correction section
14 Black generation and under color removal section (image processing section)
15 Spatial filter section (image processing section)
16 Enlarging/reducing section (adjustment process section)
17 Output tone correction section (image processing section)
18 Halftone generation section (image processing section)
100 Image forming apparatus
102 Image processing apparatus
103 Image output apparatus (output apparatus)
104 Image display device (display device)
106 Transmitting device (output device)
107 Storage device (storage section)
108 Control section (information readout section)

The invention claimed is:

1. An image processing apparatus comprising:
   an image processing section which executes, when an image data to be used for a preview display to be executed before an output process for outputting an image is inputted, a plurality of types of image processing for a display process on the image data; and
   a segmentation process section which performs a segmentation process on the image data that is to be inputted to the image processing section;
   one of the plurality of types of image processing being a downsampling process; and
   at least one of the plurality of types of image processing other than the downsampling process being a predetermined image processing,
   when a degree of downsampling in the downsampling process is not higher than predetermined reference level, the image processing section executing the predetermined image processing in such a way that the predetermined image processing is varied in content according to a result of the segmentation process, and
   when the degree of downsampling in the downsampling process is higher than the predetermined reference level, the image processing section executing the predetermined image processing regardless of the segmentation process;
   wherein the image processing section includes an adjustment process section which adjusts a size of an image of the image data by performing the downsampling process in accordance with a display zoom ratio indicative of a proportion of the size of the image of the image data after the downsampling process to the size of the image of the image data before the downsampling process;
   when the display zoom ratio is not less than a threshold value, the image processing section executes the predetermined image processing in such a way that the predetermined image processing is varied in content according to a result of the segmentation process, considering that the degree of downsampling in the downsampling process is not higher than the predetermined reference level; and
   when the display zoom ratio is less than the threshold value, the image processing section executes the predetermined image processing regardless of the segmentation process, considering that the degree of downsampling in the downsampling process is higher than the predetermined reference level.

2. The image processing apparatus as set forth in claim 1, wherein the size is a length of the image along a main scanning direction or a length of the image along a sub-scanning direction.

3. The image processing apparatus as set forth in claim 1, further comprising:
   a storage section in which to store segmentation information indicative of the result of the segmentation process after the segmentation process; and
   an information readout section which, when the display zoom ratio is not less than the threshold value, reads out the segmentation information from the storage section and inputs the segmentation information to the image processing section, and which, when the display zoom ratio is less than the threshold value, does not read out the segmentation information from the storage section.

4. The image processing apparatus as set forth in claim 1, further comprising:
   a segmentation information compression section which compresses segmentation information indicative of the result of the segmentation process after the segmentation process; and
   a segmentation information decompression section which, when the display zoom ratio is not less than the threshold value, decompresses the compressed segmentation information, and which, when the display zoom ratio is less than the threshold value, does not decompress the compressed segmentation information.

5. The image processing apparatus as set forth in claim 1, further comprising a segmentation information supply section which supplies segmentation information indicative of the result of the segmentation process to the image processing section when the display zoom ratio is not less than the threshold value, and which supplies dummy information to the image processing section instead of the segmentation information when the display zoom ratio is less than the threshold value.

6. The image processing apparatus as set forth in claim 1, further comprising a segmentation information supply section which supplies segmentation information indicative of the result of the segmentation process to the image processing section when the display zoom ratio is not less than the threshold value, and which supplies segmentation information not indicative of the result of the segmentation process but indicative of default to the image processing section when the display zoom ratio is less than the threshold value.

7. The image processing apparatus as set forth in claim 1, further comprising a segmentation information supply section which supplies segmentation information indicative of the result of the segmentation process to the image processing section, wherein:
   when the display zoom ratio is not less than the threshold value, the image processing section refers to segmentation information supplied from the segmentation information supply section; and
   when the display zoom ratio is less than the threshold value, the image processing section does not refer to the segmentation information supplied from the segmentation information supply section.

8. The image processing apparatus as set forth in claim 1, wherein:
   the segmentation process section performs the segmentation process when the display zoom ratio is not less than the threshold value; and the segmentation process section does not perform the segmentation process when the display zoom ratio is less than the threshold value.

\* \* \* \* \*